United States Patent [19]
Yamashita et al.

[11] Patent Number: 6,119,801
[45] Date of Patent: Sep. 19, 2000

[54] POWER ASSISTED BICYCLE

[75] Inventors: Izumi Yamashita; Yoshiharu Yokoyama; Takeshi Nagase, all of Iwata, Japan

[73] Assignee: Yamaha Hatsudoki Kabushiki Kaisha, Japan

[21] Appl. No.: 08/905,169

[22] Filed: Aug. 1, 1997

[30]    Foreign Application Priority Data

Aug. 2, 1996  [JP]  Japan ................................. 8-204583
May 30, 1997  [JP]  Japan ................................. 9-142742

[51] Int. Cl.$^7$ ................................................ B62K 11/00
[52] U.S. Cl. ................................ 180/205; 180/291
[58] Field of Search ................................. 180/218, 219, 180/230, 205, 206, 207, 65.2, 65.3, 11, 220

[56]    References Cited

U.S. PATENT DOCUMENTS

| | | | |
|---|---|---|---|
| 4,026,375 | 5/1977 | Miura | 180/30 C |
| 4,140,195 | 2/1979 | Watanabe et al. | 180/33 C |
| 4,280,581 | 7/1981 | Rudwick | 180/207 |
| 5,242,335 | 9/1993 | Kutter | 475/4 |
| 5,361,863 | 11/1994 | Goodwin | 180/205 |
| 5,758,736 | 6/1998 | Yamauchi | 180/220 |
| 5,909,781 | 6/1999 | Yonekawa et al. | 180/206 |
| 5,915,493 | 6/1999 | Nakayama | 180/206 |
| 5,924,511 | 7/1999 | Takata | 180/205 |
| 5,937,962 | 8/1999 | Tokoyama | 180/205 |

FOREIGN PATENT DOCUMENTS

| | | |
|---|---|---|
| 590674 | 4/1994 | European Pat. Off. . |
| 636536 | 2/1995 | European Pat. Off. . |
| 2587295 | 3/1987 | France . |

*Primary Examiner*—Paul N. Dickson
*Assistant Examiner*—Daniel Yeagley
*Attorney, Agent, or Firm*—Knobbe, Martens, Olson & Bear, LLP

[57]    ABSTRACT

Several embodiments of prime mover-assisted pedal-operated vehicles, such as a bicycle. In each embodiment, both the prime mover and the pedal mechanism drive the rear wheel through a common transfer shaft. The transfer shaft is disposed vertically above the pedal-operated crankshaft axis so as to improve the ground clearance and simplify the overall construction of the bicycle. The transmission arrangement is such that the prime mover transmission ratios are always in a step-down condition while the pedal-operated crankshaft drives the transfer shaft through a step-up transmission. Various embodiments of improved torque sensors are also employed so as to provide smooth transition and smooth feel to the rider.

33 Claims, 20 Drawing Sheets

POWER ASSISTED BICYCLE

BACKGROUND OF THE INVENTION

This invention relates to a power assisted, manually operated vehicle such as a bicycle or the like and more particularly to an improved drive arrangement therefore.

There is considerable interest in the utilization of power assist mechanisms for manually powered vehicles such as bicycles. By utilizing a power assist, it is possible to widen the use of such vehicles and permit their utilization by individuals who might not otherwise be able to ride or operate them.

Generally, the power assist mechanism is provided by a prime mover such as a internal combustion engine or an electric motor. In one form of such vehicle, the amount of power assist provided by the prime mover is varied in response to the input force from the operator.

These mechanisms employ a first transmission that drives a transfer shaft from both the pedal operated mechanism of the vehicle and the prime mover. The transfer shaft then drives the rear wheel through a final drive transmission. Frequently, the transfer shaft is disposed so that it is in substantial alignment with the engine crankshaft and may in fact be incorporated in a common drive with it. This requires the prime mover and its transmission to be juxtapose to this same general location. As a result, the drive mechanism for the vehicle is located relatively low and close to the ground. This further complicates the frame structure for the vehicle.

That is, if the vehicle is a bicycle, the chain stays are positioned in surrounding relationship to the final drive and are also located relatively low in the vehicle. This gives rise to ground clearance and other disadvantages.

It is, therefore, a principal object of this invention to provide an improved transmission arrangement for a power assisted, manually powered vehicle.

It is a further object of this invention to provide an improved transmission arrangement for a power assisted, manually operated vehicle wherein the transfer drive and the power assist are located above the axis of the crankshaft so as to improve the frame construction and reduce the number of low components so as to offer improvements in ground clearance.

It is a still further object of this invention to provide an improved transmission arrangement for a power assisted, manually powered vehicle wherein the power assist mechanism can be located at a relatively high location so as to improve ground clearance.

In power assisted, manually operated vehicles, it is generally the practice to employ in the transmission from the crank mechanism to the driven wheel a step-up transmission. This permits the rear wheel to be driven at a faster speed of rotation than the manually operated crankshaft.

However, the power assist mechanism generally includes a prime mover, as of the aforenoted types, that dictates the use of a step-down transmission. Thus, it has been the practice to employ a step-down transmission between the output shaft of the prime mover and the transfer shaft. Since the transfer shaft provides a step-up mechanism, a greater step-down must be utilized in the transmission drive from the prime mover. Thus, the speed of the prime mover drives the rear wheel first through a step-down transmission and then a step-up transmission which is quite inefficient.

It is, therefore, a further object of this invention to provide an improved transmission arrangement for a power assisted, manually operated vehicle.

It is a further object of this invention to provide an improved transmission for a power assisted, manually operated vehicle wherein the entire transmission ratio from the prime mover to the driven wheel is a step-down ratio while the transmission from the manually operated crankshaft to the rear wheel is a step-up transmission.

SUMMARY OF THE INVENTION

The embodiments of this invention are adapted to be incorporated in a power assisted, manually power operated vehicle comprised of a frame assembly that dirigibly supports at least one front wheel at the forward end thereof. At least one driven rear wheel is journaled for rotation at the rear end of the frame assembly. A seat is carried by the frame assembly for accommodating a rider. A crank mechanism is journaled for rotation at the lower portion of the frame assembly about a crankshaft axis and has pedals for operation by a rider seated on the seat. A transfer shaft is rotatably journaled by the frame assembly about a transfer shaft axis and drives the rear wheel through a final drive. A prime mover is supported by the frame assembly for driving the transfer shaft through a first transmission and the crankshaft is coupled to drive the transfer shaft through a second transmission.

In accordance with a first feature of the invention, the transfer shaft is disposed vertically above the crankshaft axis and the prime mover is disposed at a forward location relative to the transfer shaft.

In accordance with another feature of the invention, the first transmission and the final drive are step-down transmissions while the second transmission is a step-up transmission.

DETAILED DESCRIPTION OF THE PREFERRED EMBODIMENTS OF THE INVENTION

Embodiment of FIGS. 1–7

Figure 1:
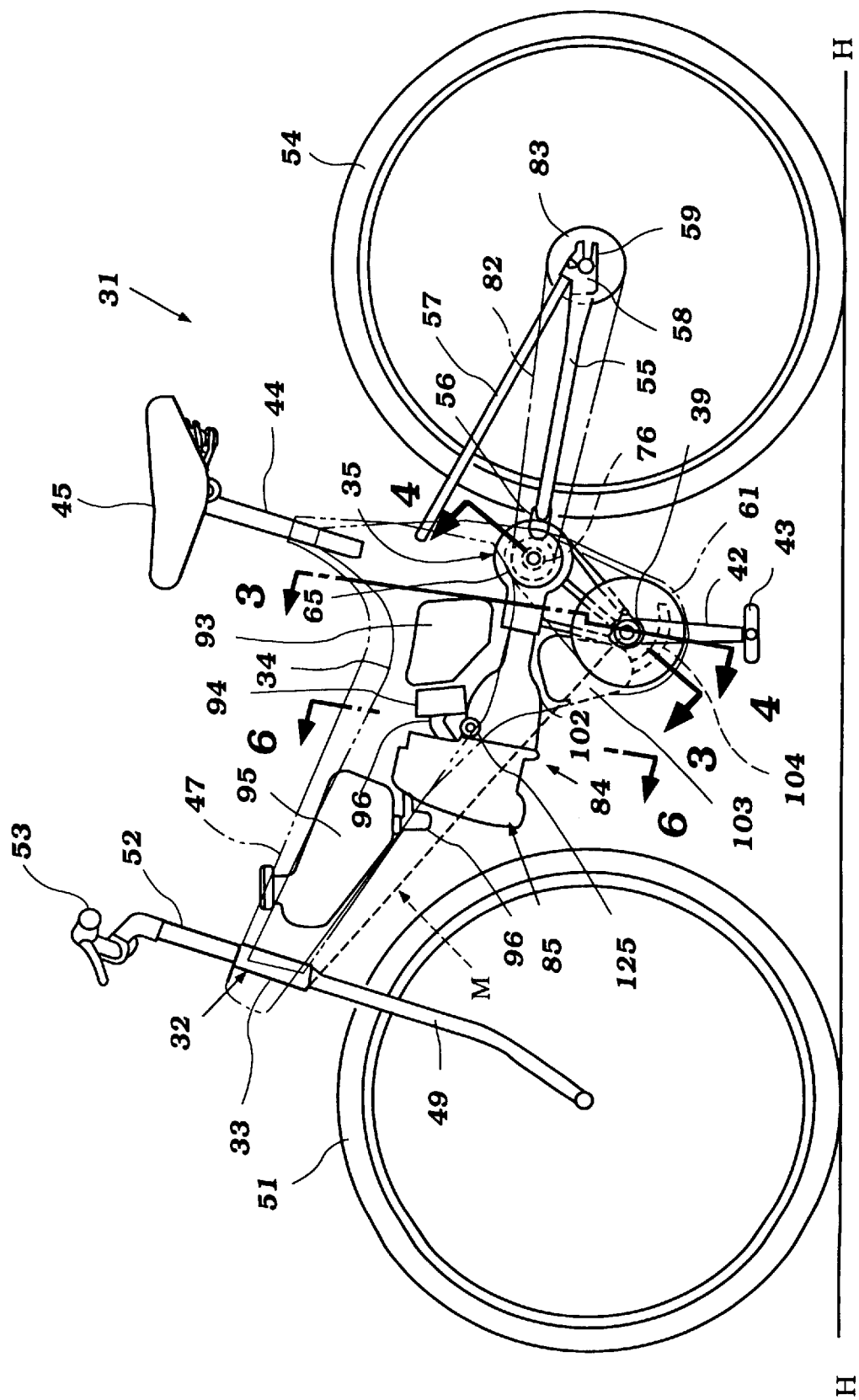
FIG. 1 is a side elevational view of a power assisted, manually operated bicycle constructed in accordance with a first embodiment of the invention.
Figure 2:
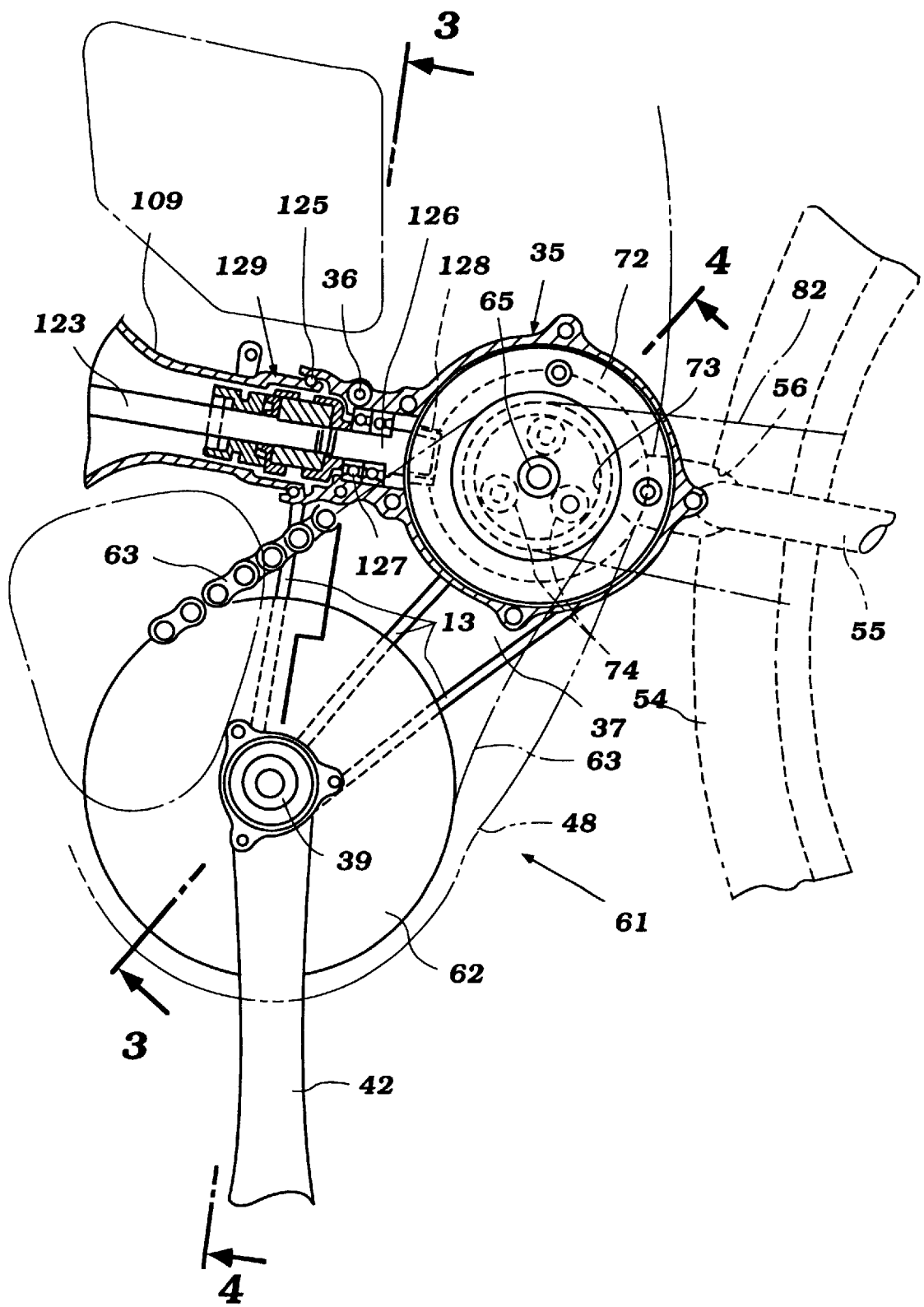
FIG. 2 is an enlarged view with portions broken away and other portions shown in phantom showing the relationship of the crankshaft axis and transfer shaft axis and the transmissions for driving the transfer shaft from the prime mover and the crankshaft.
Figure 3:
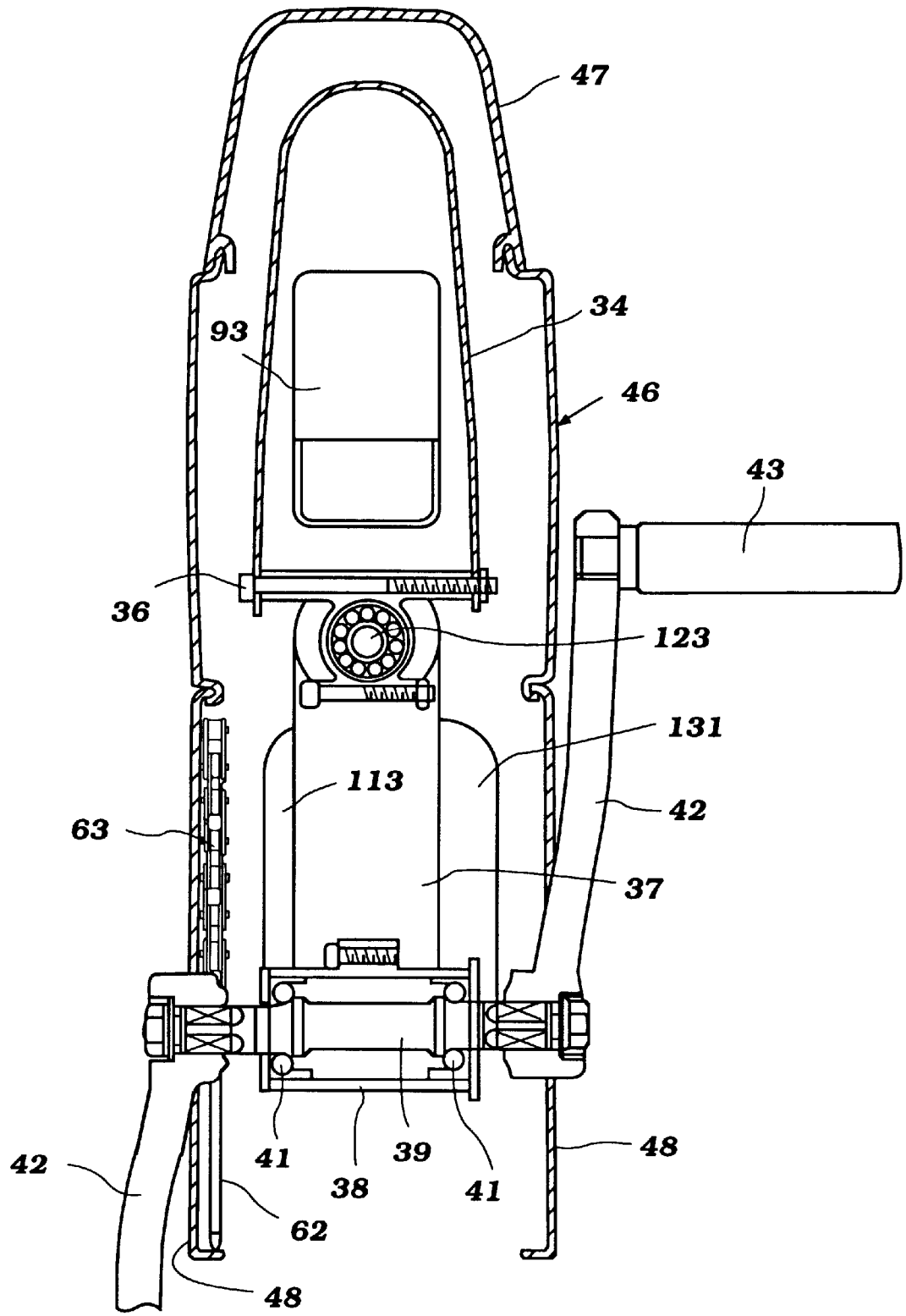
FIG. 3 is an enlarged cross-sectional view taken along the line 3—3 of FIGS. 1 and 2.

Referring first to this embodiment and initially primarily to FIGS. 1–4, a power assisted, manually operated bicycle constructed in accordance with this embodiment is indicated generally by the reference numeral 31. The bicycle 31 is comprised of a frame assembly, indicated generally by the reference numeral 32 and which is comprised of a head pipe 33 and a main frame assembly 34. The main frame assembly 34 is generally comprised of a stamping formed from sheet metal and having a generally inverted U-shape as best seen in FIG. 3. This type of frame assembly is typical of those with which the invention may be utilized.

Supported below the frame assembly 34 is a transfer shaft case, indicated generally by the reference numeral 35. This case 35 is supported from the frame assembly 34 by means that include a through bolt 36 (FIG. 3) which extends through the lower portions of the frame member 34 and through a suitable opening in the transmission case 35 for supporting it.

An extension 37 of the transfer shaft case 35 extends downwardly and has a tubular portion 38 in which a crankshaft 39 is supported for rotation about a transversely extending axis. This crankshaft 39 is journaled by bearings 41 and has a pair of crank arms 42 affixed to its outwardly extending portions in a known manner. Pedals 43 are rotatably journaled at the outer ends of these crank arms 42.

A seat post 44 is carried by the frame member 34 and has a seat 45 adjustably carried at its upper end for accommodating a rider. The seat 45 is positioned so that the rider's legs may extend on the opposite sides of the frame member 34 for operating the pedals 43 in a known manner.

A body assembly, which may be formed from a molded fiberglass reinforced resin or the like, indicated generally by the reference numeral 46, encloses the frame assembly 34, transfer gear case 35, and certain other components which will be described. This body 46 has a detachable cover portion 47 for permitting access to the enclosed components. In addition, a pair of chain guard portions 48 depend from the lower portion of the body 46 and extend on opposite sides of the transmission extension 37.

A front fork 49 rotatably and dirigibly supports a front wheel 51. The front fork has a handlebar assembly 52 affixed to its upper end which supports a handlebar 53 for steering of the front wheel 51 by the rider seated on the seat 45.

A rear wheel 54 is rotatably journaled at the back of the frame assembly 32 by means which include a pair of rearwardly extending chain stays 55. These chain stays 55 extend forwardly and are connected to the frame member 34 by a pair of flattened portions 56 so that the connection to the frame member 34 is facilitated. If desired, this connection may be provided by a pivotal connection if it is desired to suspend the rear wheel 54 for suspension movement. The chain stays 55 lie on opposite sides of the rear wheel 54 and define a plane that lies generally parallel to the horizontal ground plane H—H. This generally parallel plane defined by the chain stays 55 is referred to in the claims as a "generally horizontal plane" consistent with this relation.

A pair of seat back stays 57 are connected to the rear ends of the chain stays 55 by means of axle brackets 58. The axle brackets 58, in turn, support an axle 59 for the rear wheel 57. The front ends of the seat stays 57 may be either rigidly attached to the frame member 34 in a suitable manner or may be connected to the frame member 34 through a cushioning arrangement if the rear wheel 54 is suspended for suspension movement.

The transmission arrangement for driving the rear wheel 54 from the pedal operated crankshaft 39 will now be described by particular reference to FIGS. 1–4. This transmission includes a first transmission, indicated generally by the reference numeral 61 and is comprised of a driving sprocket 62 that is fixed for rotation in an appropriate manner to the crankshaft 39. A driving chain 63 is entrained with the sprocket 62 and drives a smaller diameter sprocket 64 that is connected to a manual input force shaft 65 journaled within the transmission case 35 by a one-way clutch 66. The one-way clutch 66 permits the sprocket 64 to drive the manual shaft 65, but will not permit the manual shaft 65 to drive the sprocket 64, for a reason which will become apparent.

The transmission case 35 journals the manual shaft 65 by a pair of spaced-apart bearing assemblies 67 and 68. A carrier 69 of a planetary transmission is affixed for rotation with the manual shaft 65 by a key 71. A ring gear 72, for a purpose which will be described encircles the carrier 69. This ring gear 72 also has internal teeth 73 which form a further ring gear that is engaged by planet gears 74 carried on the carrier 69 by pins 75.

Figure 7:
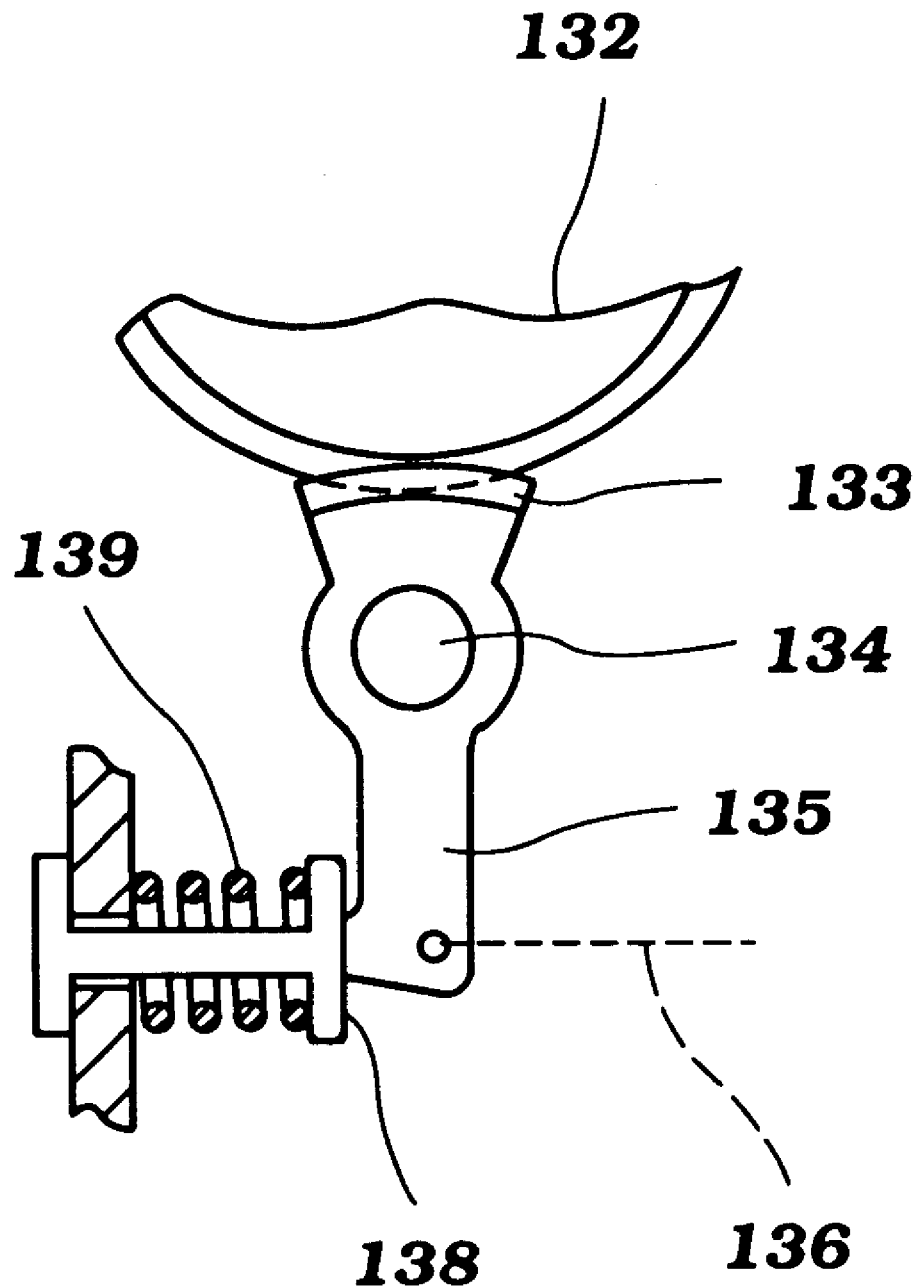
FIG. 7 is an enlarged side elevational view taken along the line 7—7 of FIG. 4 showing the torque sensing device of this embodiment and its interconnection to the engine throttle valve.

The planet gears 74 are also enmeshed with a sun gear 76 that is journaled by bearings 77 on the manual input shaft 65. The sun gear 76 is supported for limited rotation via a mechanism which is shown in FIG. 7 and which performs a torque sensing function, as will be described later by reference to that figure.

Thus, the manual portion of the planetary transmission generally operates as a step-up transmission so that the manual shaft 65 drives the ring gear 72 and its internal ring gear 74 at a faster rate than the sprocket 64. In addition, the sprocket 64 is driven at a faster rate than the sprocket 62, so there is a double step-up in the speed of rotation from that of the crankshaft 39.

The ring gear 72 has a hub portion 78 that extends through one side of the transmission case 35. This forms a transfer shaft. A driving sprocket 79 is affixed to this transfer shaft and is further journaled by a bearing assembly 81.

The sprocket 79 forms a final drive to drive a chain 82 which, in turn, drives a driven sprocket 83 that is fixed for rotation with the rear wheel 54 so as to manually drive the rear wheel. This final drive transmission provides a slight step-down in speed, but still causes the rear wheel 54 to rotate at a faster velocity than the crankshaft 39.

In addition to the manual power drive for the rear wheel 54, there is also provided a prime mover power assist unit, indicated generally by the reference numeral 84. The power assist unit 84 is suspended from the frame 32 in a manner which will be described and which also includes the mounting bolt 36 that suspends the transmission case 35. As will become apparent, the assist unit 84 is connected to and drives a portion of the transmission within the case 35.

A prime mover, indicated generally by the reference numeral 85, is provided for providing this power assist. In the illustrated embodiment, the prime mover 85 constitutes a single cylinder, two-cycle, internal combustion engine, although obviously, other types of prime movers and other types of engines can be utilized for this purpose.

Figure 5:
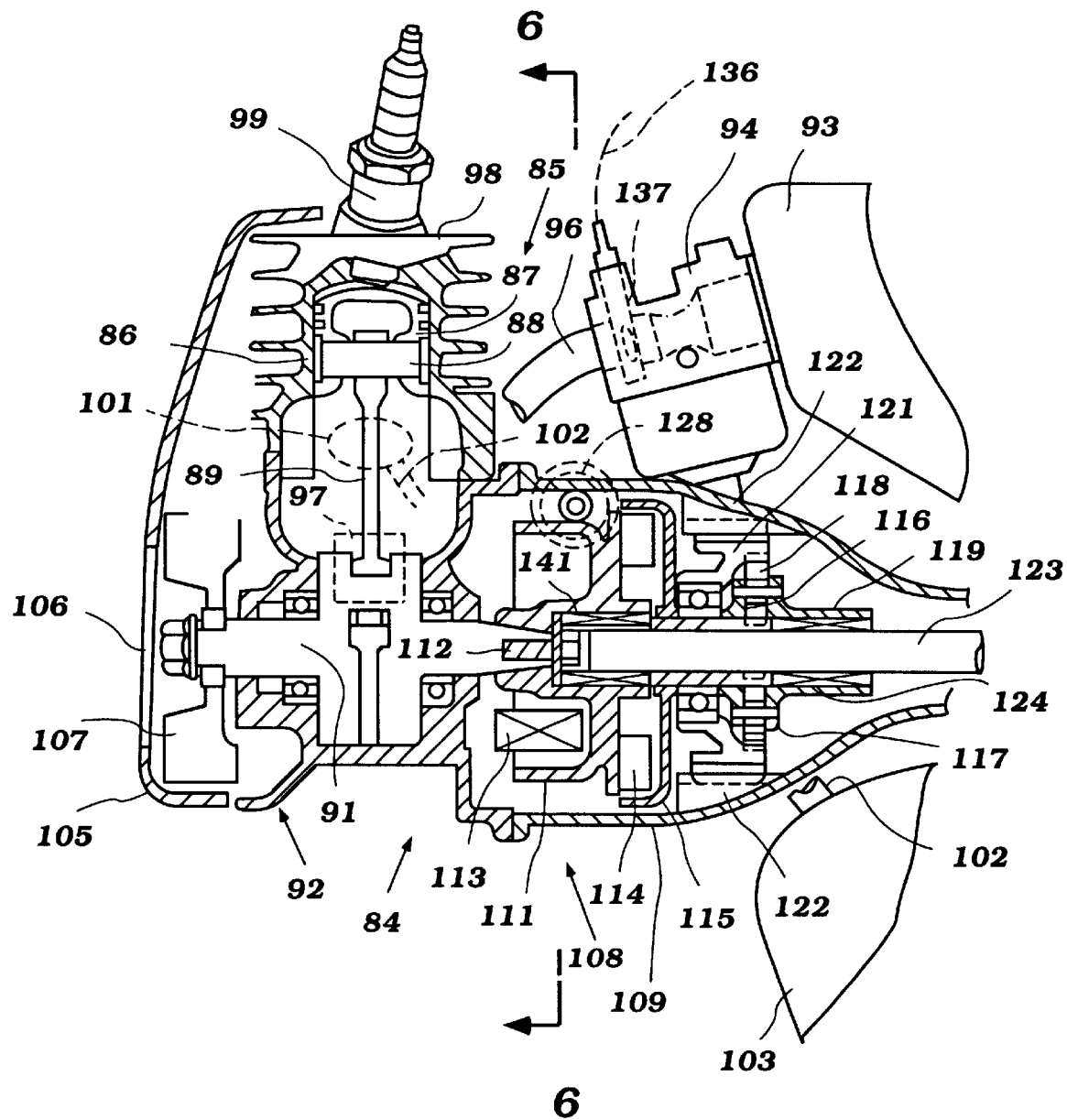
FIG. 5 is a view looking in the same direction as FIGS. 1 and 2 but is a cross-sectional view showing the prime mover of this embodiment and a portion of the transmission by which it drives the transfer shaft.
Figure 6:
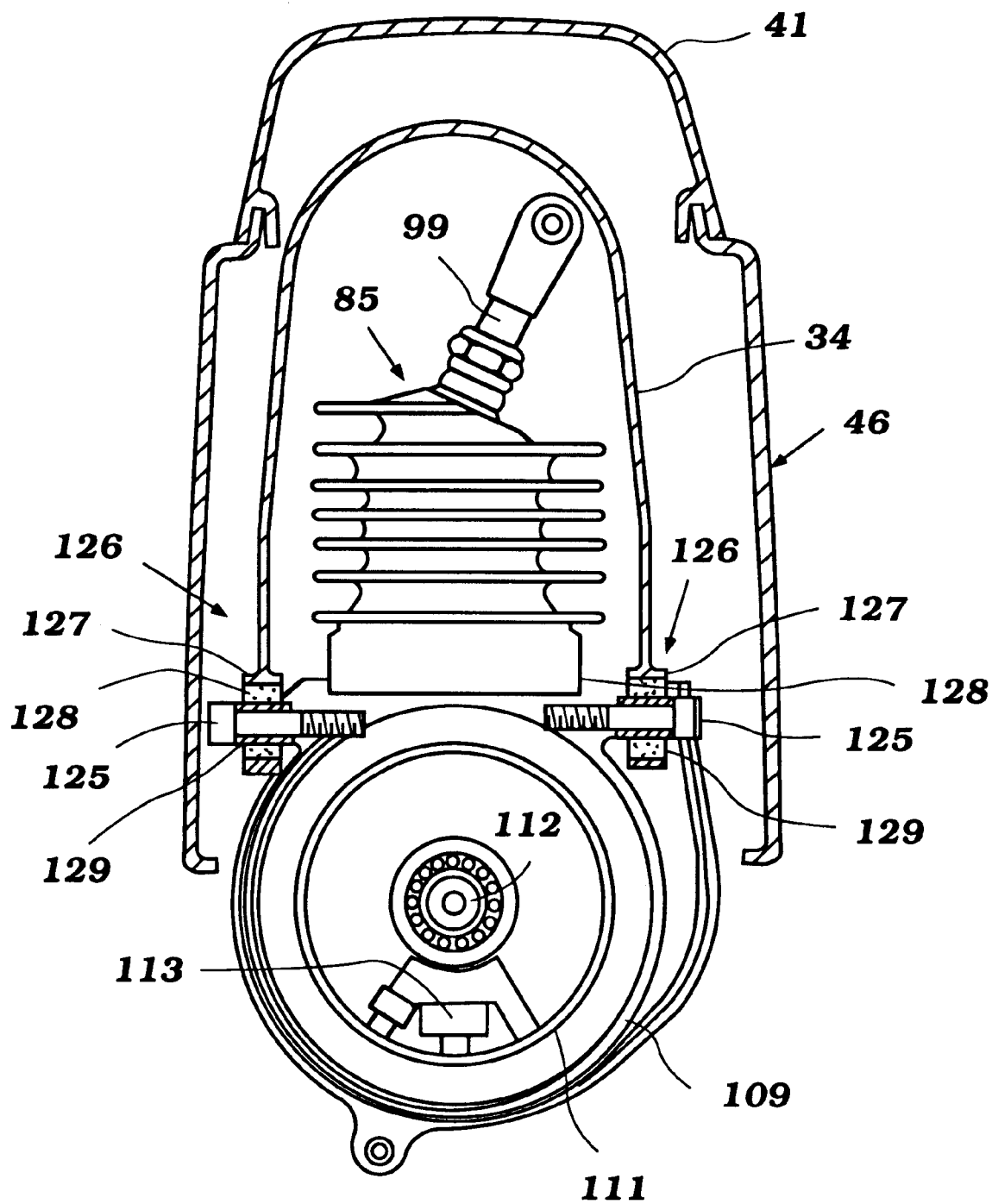
FIG. 6 is a cross-sectional view taken along the line 6—6 of FIGS. 1 and 5.

The engine 85 is seen best in FIGS. 5 and 6, and is comprised of a cylinder block 86 having a cylinder bore that extends in a generally vertical direction and in which a piston 87 reciprocates. A piston pin 88 connects the piston 87 to the small end of a connecting rod 89. The large or big end of the connecting rod 89 is journaled on the throw of a crankshaft 91. The crankshaft 91 is rotatably journaled within a crankcase member 92 that is fixed to or forms a part of the cylinder block 86.

A fuel-air mixture is supplied to the crankcase chamber in which the crankshaft 91 rotates in a manner typical of two-cycle engines. Since the construction of the engine 85, per se, forms no part of the invention other than its orientation, reference may be had to any conventional prior art type of structure that be utilized in conjunction with the invention.

However, the engine 86 includes an air inlet device and silencer 93 which is conveniently mounted in the void area formed by the frame member 34. This device 93 draws intake air from the atmosphere, silences and filters it, and delivers it to a carburetor 94. The carburetor 94, in turn, forms a fuel-air mixture utilizing this air, and fuel that is drawn from a fuel tank 95.

The fuel tank 95 is also mounted within the frame member 34 at the front thereof. A fuel line having a shut-off valve 96 supplies fuel from the tank 95 to the carburetor 94.

The carburetor 94, in turn, delivers the fuel-air charge to an intake manifold 96 which, in turn, communicates with the crankcase chamber through a reed-type check valve 97, as is typical with two-cycle, crankcase compression engines.

This charge is then transferred to the combustion chamber formed above the piston 87 in part by a cylinder head 98 through suitable scavenge passages, as is well known in the art. This charge is then fired by a spark plug 99. The spark plug 99 is powered by an ignition system, which will be described later.

The charge which is burned when the spark plug 99 is fired is discharged through an exhaust port 101 and to an exhaust manifold 102. The exhaust manifold 102 delivers the exhaust gases to a muffler 103 that is mounted to the rear and below the engine 85. The silenced exhaust gases are then discharged to the atmosphere through an exhaust pipe 104.

The engine 85 is air cooled. To assist in this cooling, a front cover 105 is mounted over the forward portion of the engine 85 and a portion which extends below the body 46. An opening 106 in this front cover permits air to be drawn by a fan 107 driven off the front of the crankshaft 91. This fan circulates cooling air over the engine 85.

The power unit 84 also includes a second transmission mechanism, indicated generally by the reference numeral 108, which is contained primarily in a transmission case 109 that is fixed to the crankcase member 92 and extends rearwardly therefrom. This transmission case 109 closes a flywheel 111 that is fixed for rotation with the crankshaft 91 by means of a fastener 112 and key.

The flywheel 111 also includes a magneto generator by carrying permanent magnets that cooperate with a winding 112 that is fixed to the transmission case 109, as best seen in FIG. 6. This flywheel magneto provides the power to fire the spark plug 99.

The flywheel 111 also carries the pivoted shoes 114 of a centrifugal clutch assembly. These pivoted shoes 114 will create frictional engagement with a clutch member 115 when the engine 85 is rotating at a predetermined speed. The driven centrifugal clutch member 115 is connected to a hub 116 which carries a sun gear 117 of a planetary step-down transmission. This sun gear is enmeshed with a plurality of planet gears 118 that are carried by a carrier 119.

These planet gears are also enmeshed with a ring gear 121 that is non-rotatably fixed by means of a lug 122 to the transmission housing 109. As a result, the rotational speed of the engine crankshaft 91 will result in a reduced rotational speed of the planet carrier 119.

The planet carrier 119 drives a drive shaft 123 via a one-way clutch 124. The one-way clutch 124 permits the motor 85, and specifically the driven centrifugal clutch element 115, to the drive shaft 123, but does not permit the drive shaft 123 to drive the flywheel member 115.

The suspension for the assist unit 84 will now be described by reference primarily to FIG. 6. It will be seen that the transmission housing 109 receives a pair of threaded fasteners 125. These threaded fasteners 125 are connected by means of elastic couplings 126 to the frame member 34. To this end, the frame member 126 is provided with a pair of bosses 127 in which elastomeric sleeves 128 are fitted. These elastomeric sleeves 128 have inner sleeves 129 that receive the fasteners 124 so as provide resilient support for the drive unit 84 on the frame member 34.

As may be best seen in FIG. 1, these fasteners 125 are located very close to a line M which connects the lower portion of the head pipe 33 with the crankshaft axis 39. The line M represents the torque or turning axis about which the pedal and handle bar force tends to cause the frame 32 to rotate. The mounting on the bolts 125 causes the inertial center of the driving unit 84 to be very close to and slightly above this line so as to reduce the likelihood of instability when high pedal forces are applied. In addition, the resilient mounting avoids the transmission of vibrations from the engine 85 to the frame 32.

Figure 4:
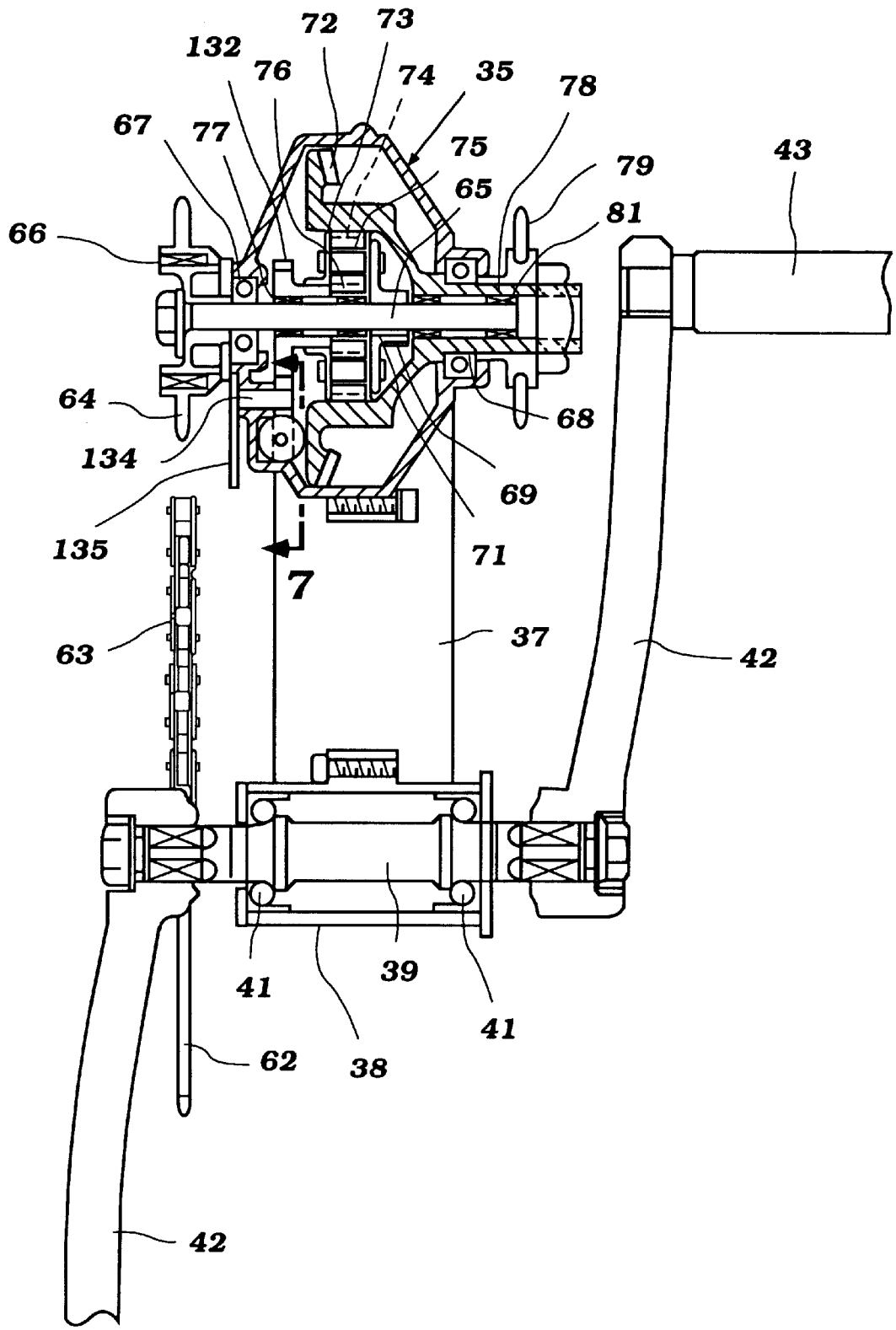
FIG. 4 is an enlarged cross-sectional view taken along the lines 4—4 of FIGS. 1 and 2.

Referring now primarily to FIGS. 2 and 4, the way in which power is transmitted from the drive shaft 123 to the rear wheel will be described. It will be seen first that the rear end of the transmission casing 109 extends into a recess formed in the front end of the transmission case 35. An elastic joint 125 is interposed therebetween so as to accommodate some slight movement, but also so as to further assist in the resilient support for the drive unit 84.

Mounted in this extension of the transmission case 35 is a pinion shaft 126. This pinion shaft 126 is journaled by bearings 127 and carries a pinion gear 128 at its rear end. The pinion gear 128 is enmeshed with the ring gear 82 so as to establish a driving connection with this ring gear.

A selectively engageable driving connection is provided between the drive shaft 123 and the pinion shaft 126 by way of a dog clutch, indicated generally by the reference numeral 129. This dog clutch 129 will be described in more detail by reference to the embodiment of FIGS. 8–18, wherein it is illustrated more fully. However, it should be understood that the clutch 129 may be disconnected so that the bicycle 31 can be driven only by manual power. When the clutch 129 is engaged, however, either the rear wheel 54 can be driven solely by pedal power through the pedals 43, or with power assist from the engine 85. In addition, engaging of the clutch 129 will permit the rider to crank-start the engine 85, in a manner which will also be described.

As best seen in FIG. 2, but also appearing in FIG. 3, is the provision on the extension portion 37 of the transmission housing 35 of a plurality of reinforcing ribs 131. These ribs 131 extend on opposite sides of the structure and provide rigidity for it. However, it should be noted that the described drive mechanism is very compact, and thus, does not extend the width of the bicycle 31. Furthermore, since the drive mechanism is via the transfer shaft, which is coaxial with the manual shaft 65, it is possible to raise the back-stays 55 and substantially improve the ground clearance of the bicycle 31.

It has been noted that the assist power provided by the power unit 84 is controlled so as to be responsive to the pressure or torque exerted by the rider on the crankshaft 39. The mechanism for achieving this control will now be described by reference to FIGS. 4, 5 and 7.

It will be remembered that the sun gear 76 is mounted so that it can rotate slightly relative to the transmission case 35. The sun gear 76 has an extending gear portion 132 that is enmeshed with a further gear segment 133 formed on a torque sensing shaft 134. The torque sensing shaft 134 is journaled in the transmission casing 35 and has an outwardly extending portion 135. A wire actuator 136 is connected to this portion and to a throttle valve 137 (FIG. 5) of the carburetor 94.

Thus, as the operator exerts more manual force on the pedals, the throttle wire 136 will be pulled, and open the throttle valve 137, to provide added motor assist. A return stop 138 is urged into contact with the lever portion 135 by a coil compression spring 139. The spring 139 resists rotation of the lever 135 and tends to urge the throttle valve 137 to its idle position. Since this mechanism is driven off of the planetary transmission, the force of the spring 139 can be maintained relatively low so as to make the device more respective and also lighter in weight.

It has been noted that the drive shaft 123 is driven by the planetary transmission carrier 198 through a one-way clutch 124. This one-way clutch 124 does not permit the engine crankshaft 91 to be driven by the drive shaft 123 through this planetary transmission. However, and as best seen in FIG. 5, the drive shaft 123 extends through the driven member 115 of the centrifugal clutch and into the flywheel 111.

A further one-way clutch 141 is interposed between the drive shaft 123 and the flywheel 111. This one-way clutch will permit the drive shaft 123 to drive the flywheel 111. The one-way clutch 141 will, however, preclude the flywheel 111 from driving the drive shaft 123. Thus, when the dog clutch 129 is engaged, pedaling of the pedals, and specifically the crankshaft 139, so that the drive shaft 123 is rotated at a speed faster than that of the crankshaft 91, will permit pedal-starting of the engine 85. However, as soon as the engine starts, it will run at a faster speed than the drive shaft 123, and the driving connection will be discontinued. Also, as has been noted, by disengaging the dog clutch 129, pure pedal operation of the bicycle is possible, without having the operator have to turn over the engine 85.

Embodiment of FIGS. 8–18

In the embodiment of the invention thus far described, the frame has a shape that generally resembles those of conventional type bicycles. However, because of the unique transmission and power unit arrangement, it is possible to utilize this drive with more radical type frame assemblies that permit a simpler, stronger and yet lighter weight construction.

FIGS. 8–18 show such an embodiment and also illustrate some other changes that may be made in the basic construction. However, since the drive unit and its driving relationship with the rear wheel is quite similar to the previously described embodiment, where components of this embodiment have the same general construction and operation, they are identified by the same reference numerals. The similar components will be described only insofar as is necessary to understand the construction and operation of this embodiment.

In this embodiment, the bicycle is indicated generally by the reference numeral 201 and, as previously noted, the differences between this embodiment and that previously described reside primarily in the frame construction, except as will be hereinafter noted.

The frame assembly is indicated generally by the reference numeral 202 and has a construction that will be described by primary reference to FIGS. 8–14. The frame 202 is comprised of a main frame subassembly that is comprised of a pair of parallelly extending tubes 203. The front ends of the tubes 203 are connected to a fender-like protrusion 204 that extends in part over the front wheel 51.

This protrusion 204 and a bracket 205 that spans the front ends of the tubes 203 journals a head pipe 206 in which the front fork 49 and handlebar assembly 52 are mounted. A guide slot 207 is also formed by the metal of the front fender 204 so as to pass control cable for the front wheel brake (not shown).

The tubes 203 extend downwardly and rearwardly and then bend up at about their mid-point and are joined at their rear end by a cross-pipe 208. This cross-pipe 208 is fixed to the bottom end of a seat tube 209 in which the seat post 44 is slidably received. A cover assembly 211 which may be formed from a molded fiberglass or the like is detachably affixed over the tops of the tubes 203.

A pair of formed sub-frame side members 212 extend on opposite sides of the cross pipe 208 and rearwardly from the tubes 203. These sub-frame side members 212 have bosses 213 that receive the ends of the cross pipe 208. These members 212 are held together by fasteners 214 so as to form a sub-frame assembly, indicated generally by the reference numeral 215.

Figure 10:
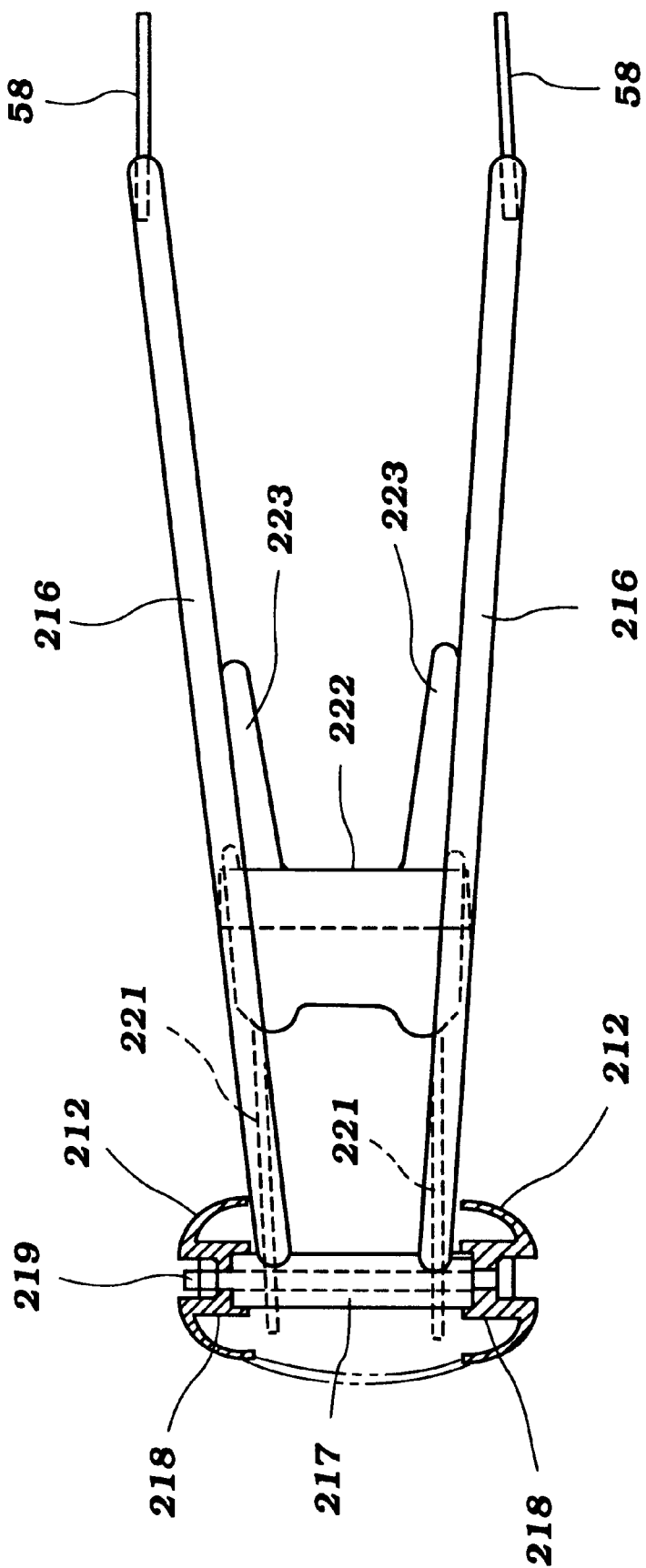
FIG. 10 is a top plan view, with portions broken away, showing the seat back stay arrangement and the associated frame construction related to it.

This sub-frame assembly acts to support the forward ends of back-stays 216, as best seen in FIG. 10. These back-stays 216 extend forwardly and are joined to a tubular member 217. The frame members 212 have further bosses 218 that receive this tubular member 217 and are connected to each other by means of a further threaded fastener 219. The rear ends of the back-stays 216 are affixed, as by welding, to the axle brackets 58.

Figure 11:
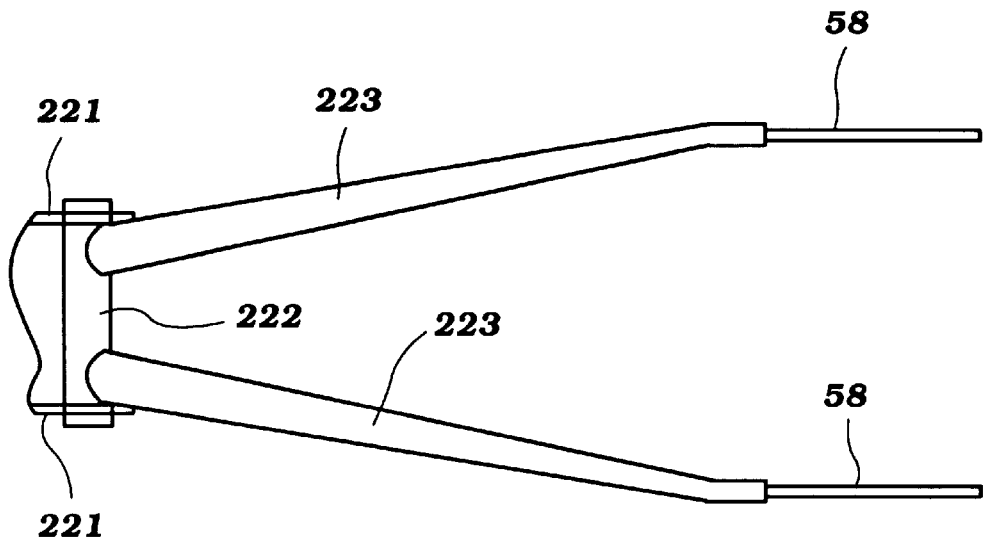
FIG. 11 is a top plan view showing the portion of the frame assembly associated with the chain stays.
Figure 14:
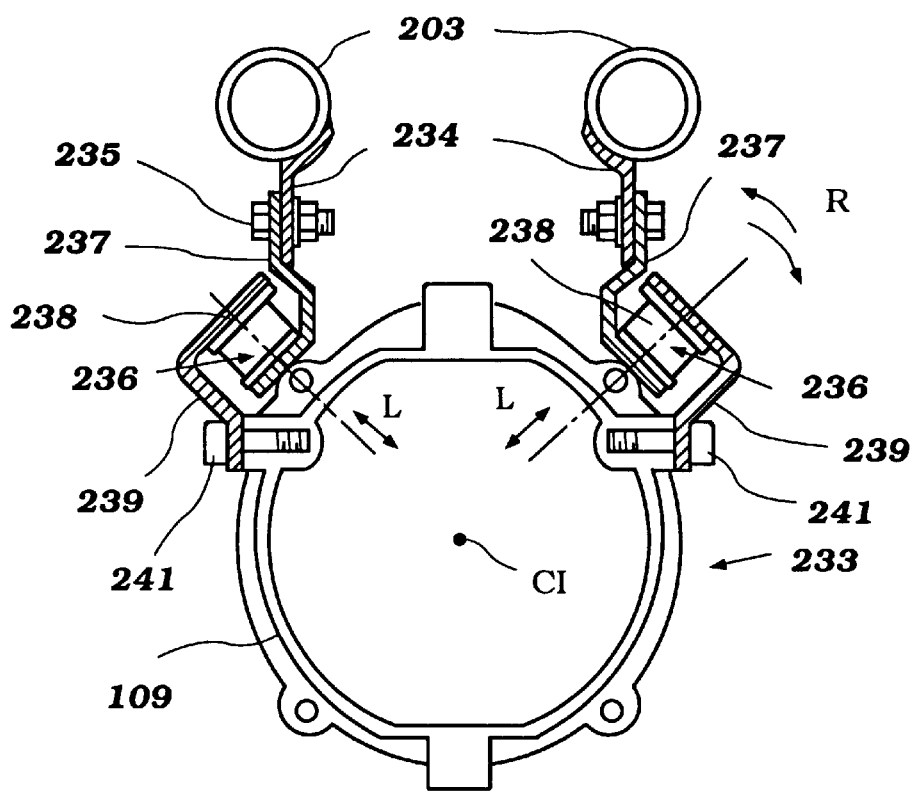
FIG. 14 is a cross-sectional view taken through the frame assembly and showing the mounting arrangement for the transfer shaft and the transmission mechanism including the power assist.

A pair of side plates 221 are fixed to the tube 217 and accordingly to the sub-frame 215, and extend downwardly and rearwardly. These plates carry, as best seen in FIG. 11, a further tubular member 222. The tubular member 222 may be pivoted to them or may be fixed, depending upon whether or not the rear wheel 54 is to be suspended for suspension movement relative to the frame assembly 202. In any event, chain guards 223 are affixed at their forward ends to the tubular member 222 and extend rearwardly, wherein they are also welded to the rear wheel axle brackets 58. Thus, a very rigid frame assembly is provided by this construction.

Figure 12:
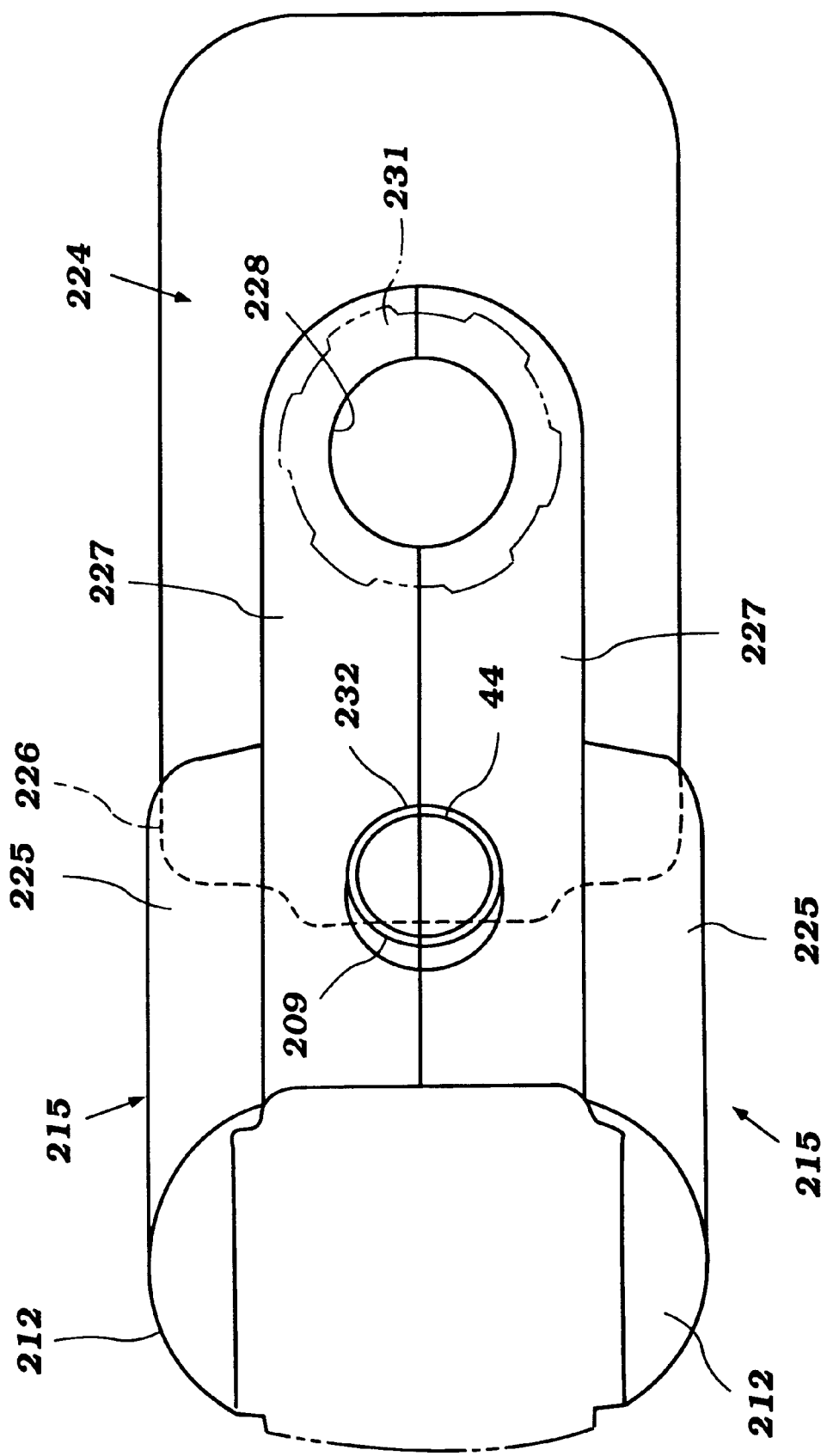
FIG. 12 is an enlarged top plan view of the rear portion of the subframe assembly showing the mounting arrangement for the fuel tank.
Figure 13:
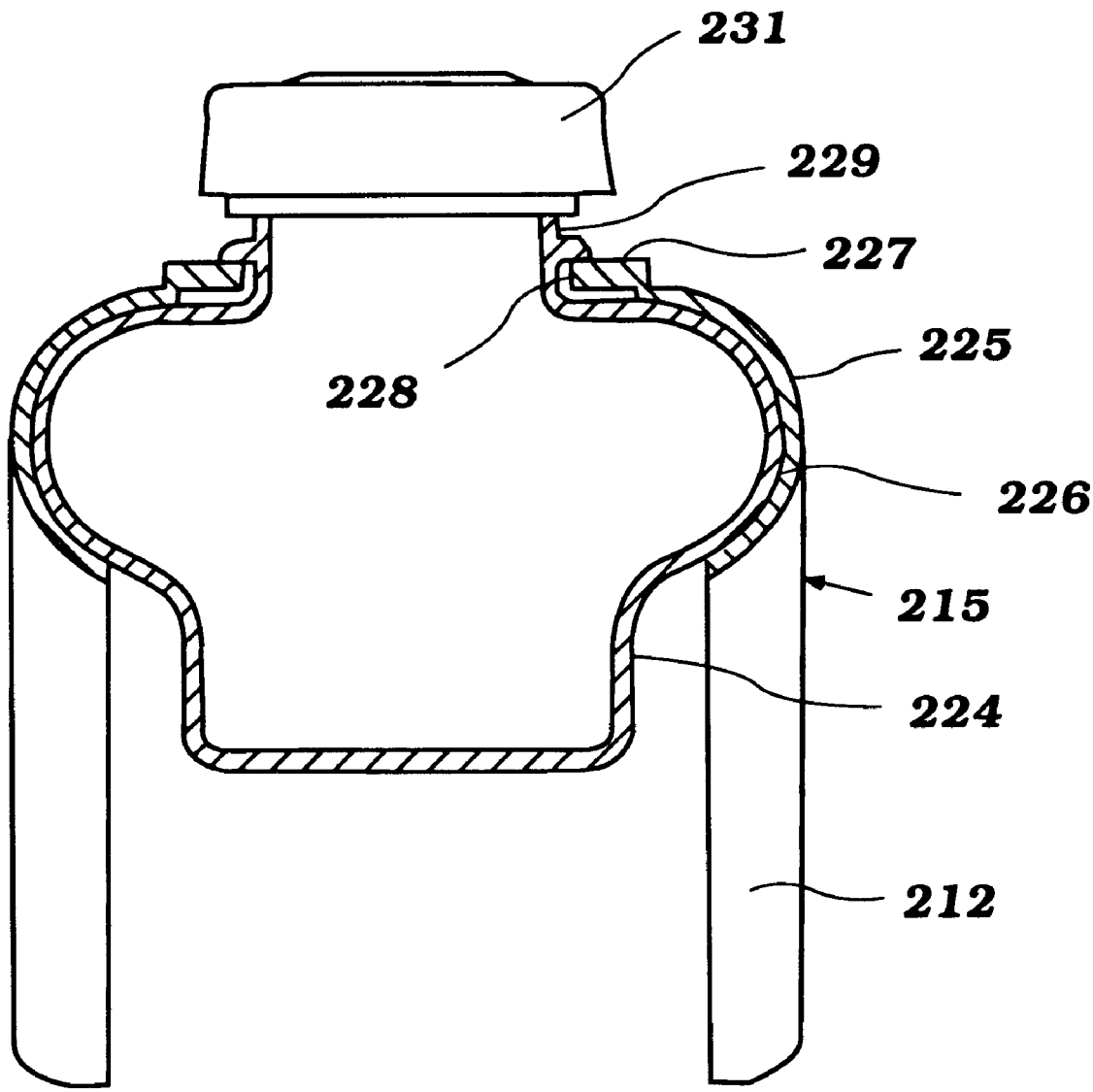
FIG. 13 is a cross-sectional view taken along a vertical plane and shows the arrangement by which the subframe assembly holds the fuel tank.
Figure 15:
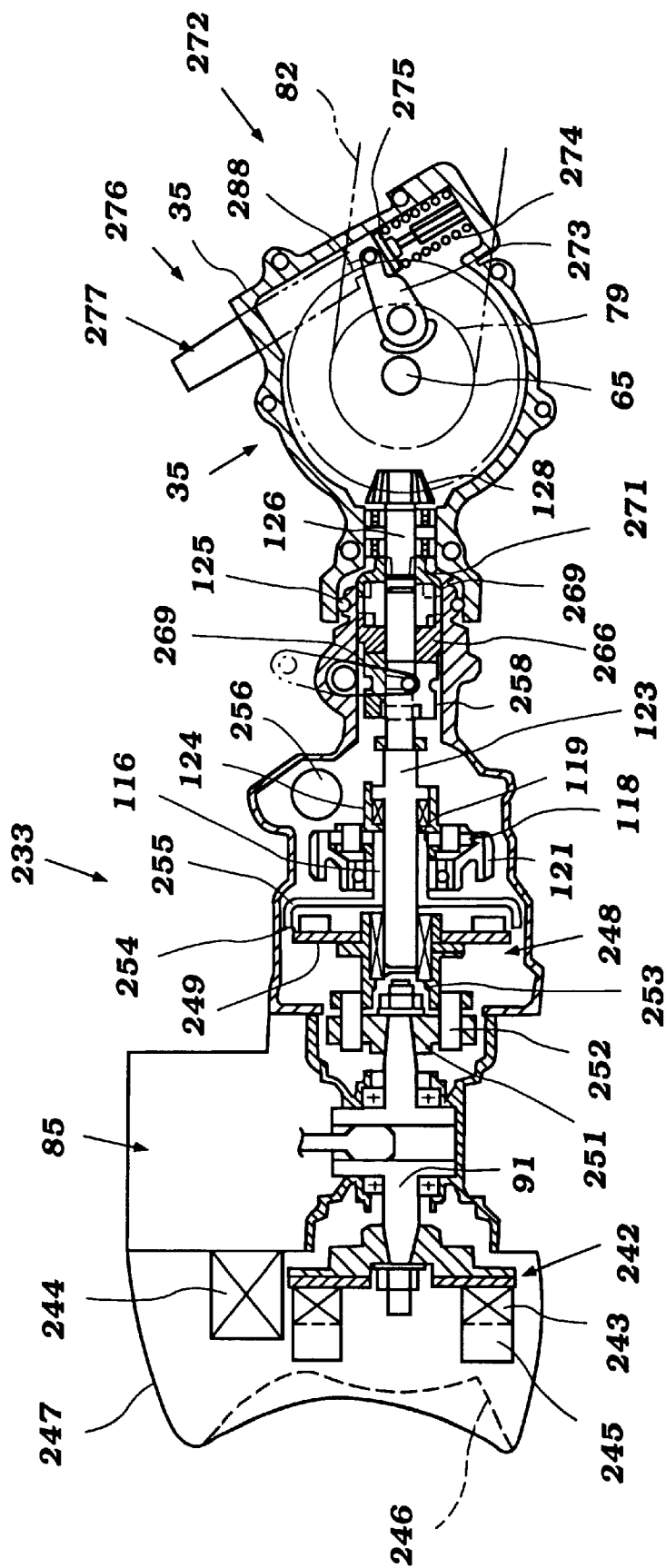
FIG. 15 is a cross-sectional view, in part similar to a combination of FIGS. 2 and 5 of the embodiment of FIGS. 1–7, and shows a portion of the transmission mechanism and torque sensor for this embodiment.

Furthermore, the sub-frame side members 212 are constructed in such a way as to have an interfitting relationship with the fuel tank, indicated generally by the reference numeral 224, as best seen in FIGS. 12 and 13. It will be seen that the sub-frame side members 212 have rearwardly extending embossments 225 which define a cavity that is complementary to an enlargement 226 of the fuel tank 224 so as to firmly clamp it in place. In addition, the upper surfaces 227 of the rearwardly extending embossments 225 of these frame members 212 define an opening 228 that receives the fill neck 229 of the fuel tank 224. A filler cap 231 closes the fuel tank filler neck 229.

Sections 232 that receive the seat post 209 also appear in FIG. 12.

The formation of the frame assembly 202 as thus far described also permits a different mounting for the power unit, indicated in this embodiment generally by the reference numeral 233. This mounting actually permits the power unit 233 to be positioned slightly higher than that of the previously described embodiment, as may be best seen in FIGS. 8 and 14.

A pair of mounting brackets 234 are affixed to the inner sides of the frame tubes 203 in a generally forward direction from the seat post 209. These brackets 234 are connected by threaded fasteners 235 to suspension elements, indicated generally by the reference numeral 236. These suspension elements 236 include brackets 237 that are fixed to one end of a respective elastomeric member 238. The other side of each elastomeric member 238 is connected to the transmission housing 109 of the propulsion unit 233 by means of brackets 239 and fasteners 241.

It should be noted that this mounting permits the elastomeric elements 238 to be disposed so that their axes intersect the center of inertia CI of the propulsion unit 233. The elastomeric elements permit greater flexibility in the rotating direction, indicated by the arrows R in FIG. 14, about the axis CI, then movement along their lines of action, indicated by the lines L. Thus, torsional vibrations are easily dampened and vibration transmission to the frame 202 is substantially minimized.

Although the basic components of the propulsion unit 233 and the driving transmission are the same as the previously described embodiment, certain components are arranged differently and also, as previously noted, the dog clutching arrangement 129 is shown in more detail in this embodiment. Thus, where components are the same, they have been indicated by the same reference numerals and will only be described insofar as is necessary to understand the construction and operation of this embodiment.

Thus, the engine, indicated by the reference numeral 85, is substantially the same as that previously described. Therefore, components which are the same have been either identified by the same reference numeral or may not be illustrated, depending on the case. In this embodiment, rather than having the flywheel magneto coupled with the centrifugal clutch, these components are separated.

Therefore, the front end of the crankshaft 91 drives a combined flywheel magneto assembly, indicated generally by the reference numeral 242, that includes a flywheel portion that carries permanent magnets 243. These cooperate with a fixed coil 244 to complete the charging system for firing the spark plugs 99 and powering additional accessories or charging a battery, if desired. In addition, the pertinent magnets 244 mount fan blades 245 that draw cooling air through an opening 246 in a flywheel cover 247 for cooling the engine 85.

The centrifugal clutch is identified generally by the reference numeral 248 and includes a driving plate 249 that is connected by means of a coupling member 251 to the end of the crankshaft 91 opposite the flywheel magneto assembly 242. Coupling pins 252 couple the coupling member 251 to a hub 253 of the disc 249 of the centrifugal clutch. Its shoes 254 cooperate with a driven member 255 to establish the driving connection.

The planetary transmission for providing the step down in this embodiment is the same as that previously described and hence, its components are identified by the same reference numerals as applied in the previous embodiment and further description of them is not believed to be necessary to permit those skilled in the art to practice the invention.

In this embodiment, however, the engine 85 is provided with a separate lubricating system and this lubricating system includes an oil pump, indicated by the reference numeral 256 and which may be of any known type. This oil pump 256 draws lubricant from a lubricant reservoir 257 (FIG. 8) that is mounted between the frame tubes 203 and forwardly of the sub-frame assembly 215. This lubricant reservoir 257 is accessible through removal of the cover 211 for replenishing the oil. Any known type of metering, lubricant system can be provided for supplying and distributing lubricant to the engine 85.

As with the previous construction, the planetary transmission drives a drive shaft 123. This drive shaft 123 is coupled to the pinion shaft 126 through the dog clutch 129 as previously described. This dog clutch mechanism is shown in more detail in FIGS. 15 and 16 and will be described by particular reference to those figures.

The dog clutch 129 includes a clutch sleeve 258 that is slidably supported for movement along the drive shaft 123. A driving connection between the drive shaft 123 and the clutch sleeve 258 is accomplished by means of a pin 259 that extends through the drive shaft 123. This pin is received in a complementary slot 261 formed in the clutch sleeve 258. This connection permits the clutch sleeve 258 to slide axially to a limited extent along the drive shaft 123 while being rotatably coupled to it.

Figure 16:
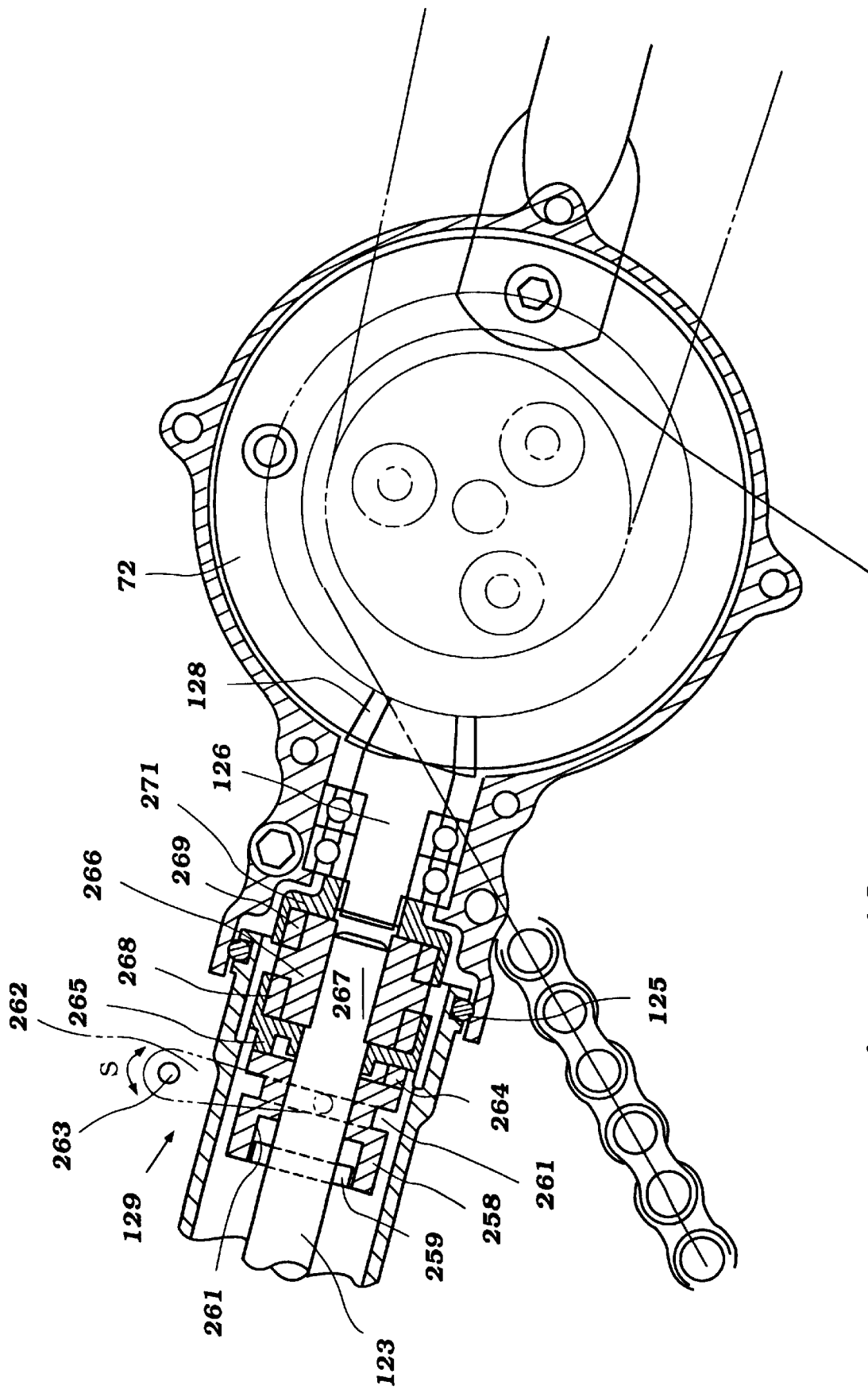
FIG. 16 is an enlarged cross-sectional view taken through the transmission and showing the clutching arrangement between the prime mover and the transfer shaft.

A shift groove 261 is formed in the clutch sleeve 258 and receives a shift fork 262 for effecting this axial shifting movement. The shift fork 262 is pivotally supported on a pivot shaft 263 and is operated as shown by the arrows in the directions indicated by the arrow S in FIG. 16. Leftward movement causes the dog clutch 129 to be disengaged from the engaged position as shown in FIG. 16.

The dog clutching sleeve 258 has one or more clutching teeth 264 that are adapted to be brought into engagement with complementary recesses formed in an elastic coupling element 265. This coupling element 265 is connected to a further coupling element 266 that is journaled for rotation on a reduced diameter end 267 of the drive shaft 123. This connection is by means of a spline-like connection indicated at 268.

A similar connection 269 couples the coupling element 266 to a further sleeve 271 that has a splined connection to the pinion shaft 126 for establishing the driving connection to this pinion shaft.

In this embodiment, the air cleaner 93 is mounted on the frame 202 between the frame tubes 203 and immediately forwardly of the oil tank 257. The carburetor 94 is mounted forwardly adjacent the mounting brackets 239 and supplies the fuel air charge to the crankcase of the engine in the manner previously described.

In this embodiment, the muffler 103 is disposed beneath the drive unit 233 and connected to it by the exhaust manifold 102. The tailpipe 104 is disposed immediately above the crankshaft 39 and below the manually driven shaft 65.

Figure 8:
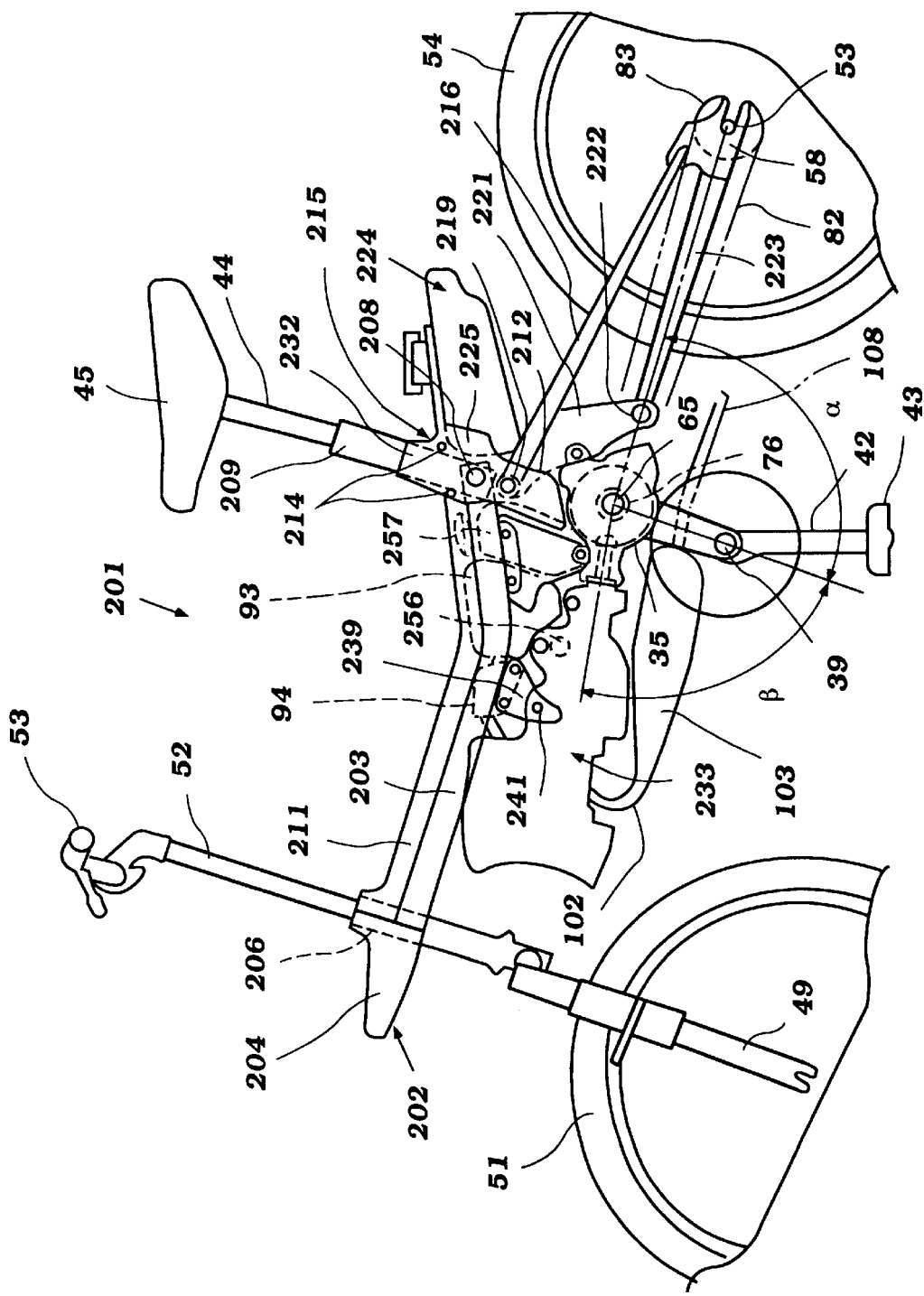
FIG. 8 is a partial side elevational view, in part similar to FIG. 1, showing a second embodiment of the invention.
Figure 9:
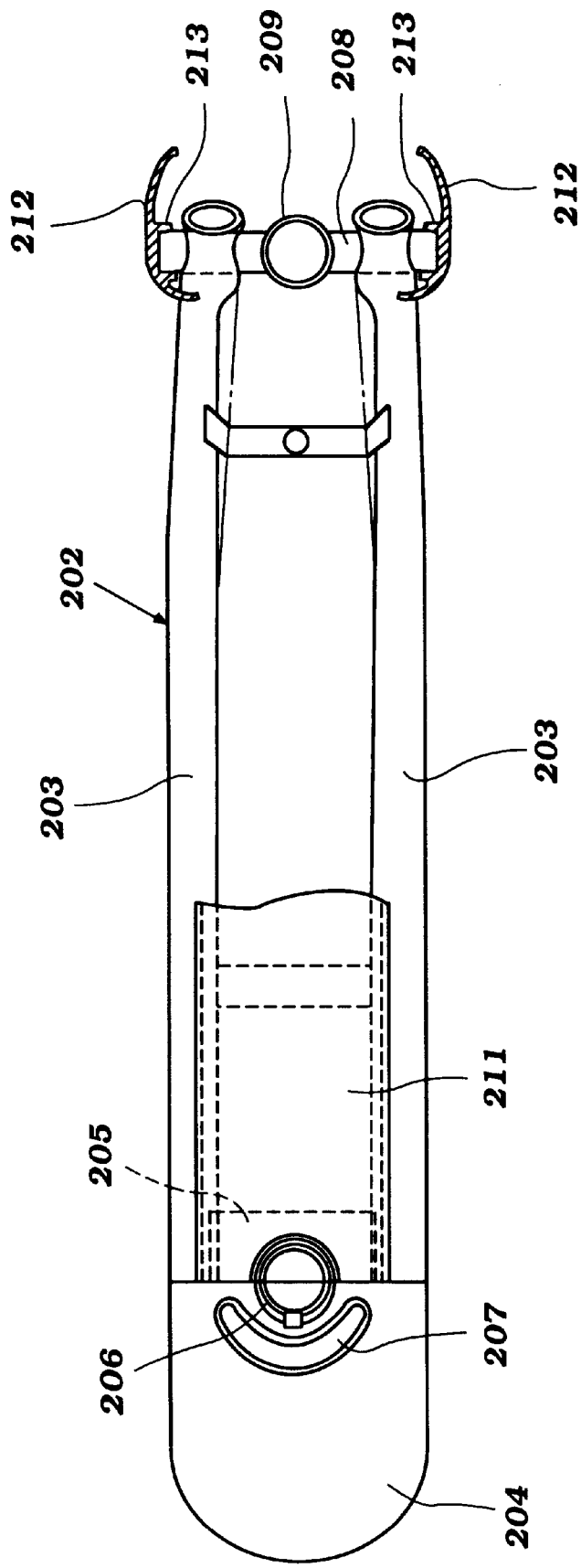
FIG. 9 is a top plan view showing a portion of the main frame assembly, with parts broken away and other parts shown in section.

Referring still to FIG. 8, it will be seen that this construction permits the further enhancement of the ground clearance. This is accomplished since a line passing through the center of the crankshaft and manual shaft axis 65 and a line passing through the center of the rear wheel axis 59 and manual shaft axis 65 is at an obtuse angle indicated at α in FIG. 8. The angle between the axis of rotation of the drive shaft 123 and the line passing through the manual shaft axis 65 and the crankshaft axis 39 is slightly less than 90 degrees as indicated by the art β in FIG. 8. Hence, the line between the drive shaft axis and the line passing through the center of the chain guards 223 is less than a straight line as in the previously-described embodiment, thus, providing a somewhat more compact assembly due to the unique frame utilize in this embodiment.

This embodiment also utilizes an improved torque sensor and associated mechanism, although it could utilize the torque sensor as previously described. As will become apparent from the description of FIGS. 15, 17 and 18, the torque sensor in this embodiment provides somewhat smoother operation. This type of torque sensor also could be utilized in the previously-described embodiment.

Like the previously-described embodiment, the torque sensor, indicated generally by the reference numeral 272, includes a torque sensor lever 273 that is rotated by a gear connection to the sun gear of the planetary transmission which drives the rear wheel drive sprocket 79. Hence, this portion of the torque sensor 272 will not be described in more detail.

The torque sensor arm 273 is urged to the position corresponding to the idle position by means of a coil compression spring 274 that bears on the torque sensor arm 273 through a bearing pad 275. However, in this embodiment there is also provided a hydraulic damper, indicated generally by the reference numeral 276 and which is shown in most detail in FIG. 17. This damper 276 is comprised of an outer housing assembly, indicated generally by the reference numeral 277, that is mounted on a mounting bracket 278 that is affixed to the transfer shaft case 35.

This housing includes a cylinder member 279 that defines a cylinder bore in which a piston 281 reciprocates. The piston is held by the spring 274 in engagement with an abutment 282 formed on an end cap 283 that closes the housing assembly 277 and which divides it into an upper fluid chamber 280 and a lower fluid chamber 284. A hydraulic fluid is contained within these chambers.

Figure 17:
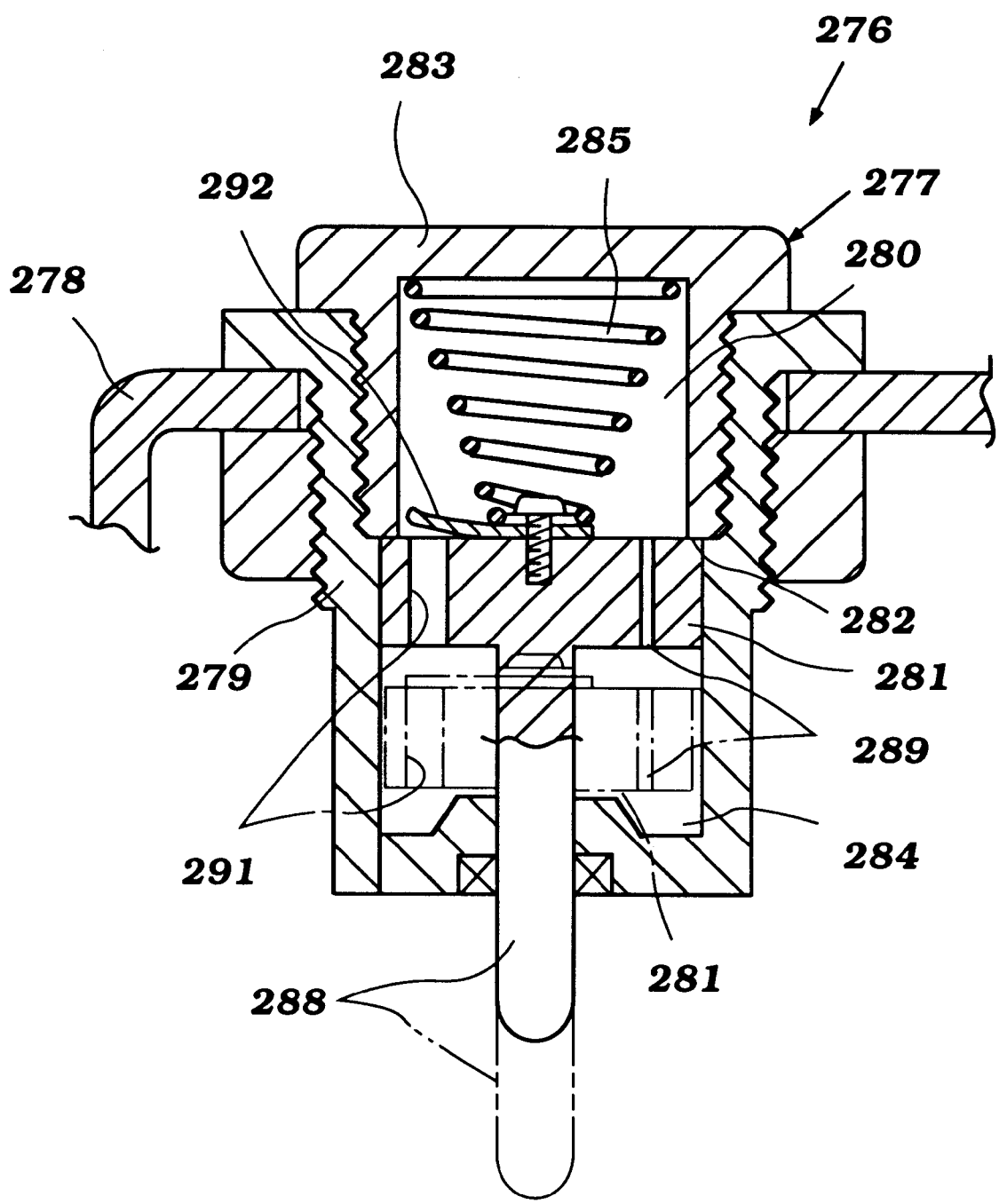
FIG. 17 is an enlarged cross-sectional view taken through the torque sensor damper arrangement.

A light coil compression spring 285 normally urges the piston 281 to a position as shown in the dotted line view of FIG. 17, this being the high torque position. That is, this is the position that the piston 281 is at when the operator is exerting the maximum torque and the torque sensing arm 273 has been rotated and compresses the spring 274.

A piston rod 288 is affixed to the piston 281 and extends through the chamber 284 so as to contact the side of the torque sensing arm 273 opposite to that acted on by the spring 274.

A restricted orifice 289 extends through the piston 281. In addition, a much less restricted larger passage 291 also extends through the piston 281. This larger passage 291 is, however, normally close by means of a reed-type valve 292. As a result of this, when the torque applied to the torque sensing arm 273 increases from low or no torque, the piston 281 can, under the action of the spring 285, follow the movement of the torque arm 273 as the load is increasing.

However, when the load decreases, the spring 274 will urge the piston 281 upwardly. This will cause the reed-type check valve 292 to close and the return of the torque arm 273 to the idle position is retarded since all of the fluid must flow from the chamber 280 to the chamber 284 through the restricted orifice 289.

Figure 18:
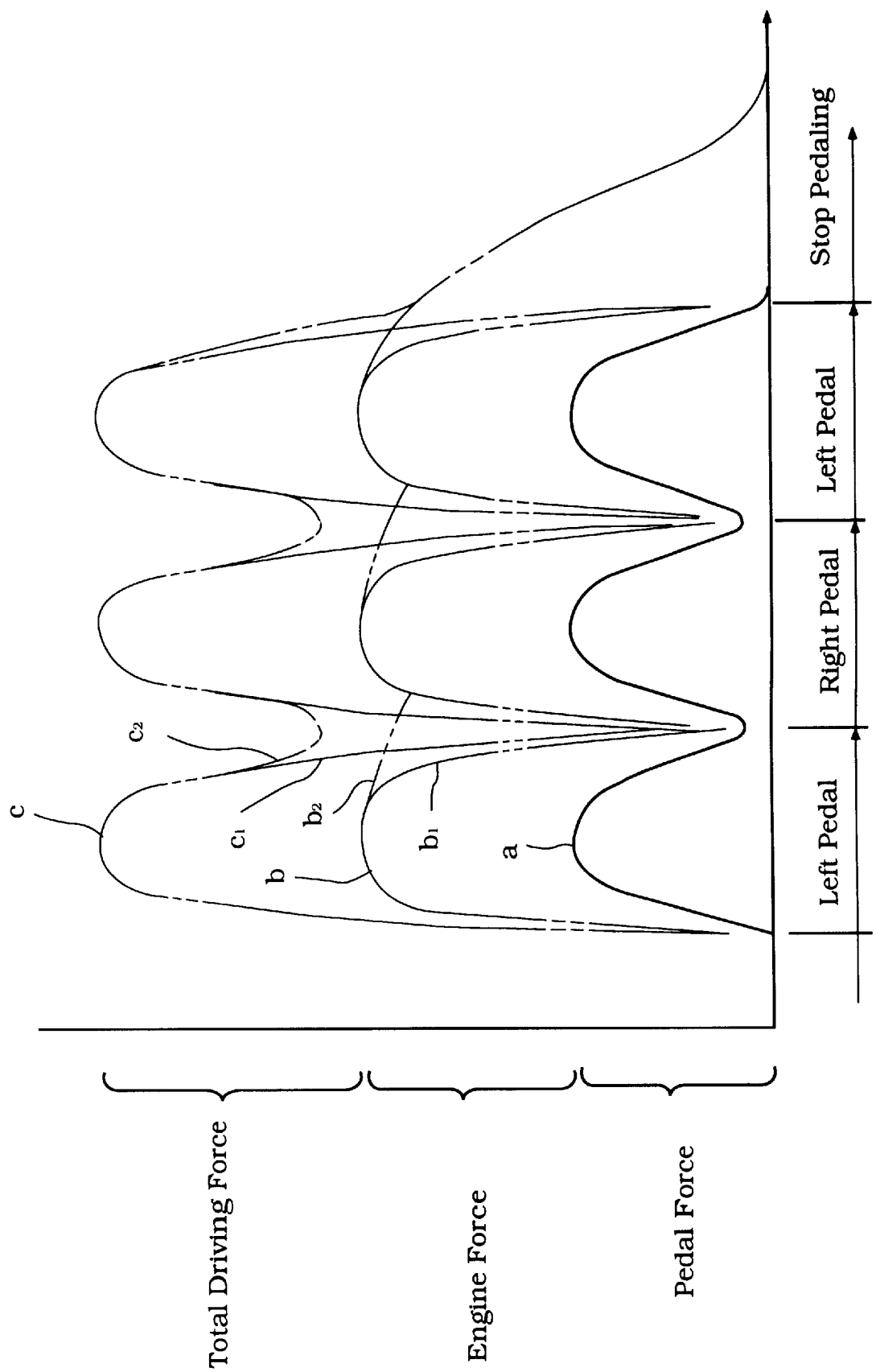
FIG. 18 is a graphical view showing the manual input force, the engine power assist force and the combined force to illustrate the operation of the damping mechanism shown in FIG. 17.

The result of this may be understood by reference to FIG. 18. As may been see in this figure, the pedal force, engine force and total driving force are indicated by the curves a, b and c, respectively. When pedaling, the force varies cyclicly, similar to the sine wave with the force building up gradually and then decreasing gradually as one pedal moves 180° from its upper to its lower position.

If the actual engine assist force followed this pedaling force, the curve b would be as indicated by the broken line b1 and would fall off at the same rate. Hence, the total driving force indicated by the dot-dash line c1 would vary substantially. However, because of the action of the damper 276, the decrease in engine speed caused by closing of the throttle is gradually decayed, as indicated by the curve portion b2. Hence, the resulting driving force, indicated by the curve portion c2, does not fall off as abruptly. Thus, a much smoother ride will be accomplished and the load on the engine will be reduced. In addition, the rider will have a much better feel.

Figure 19:
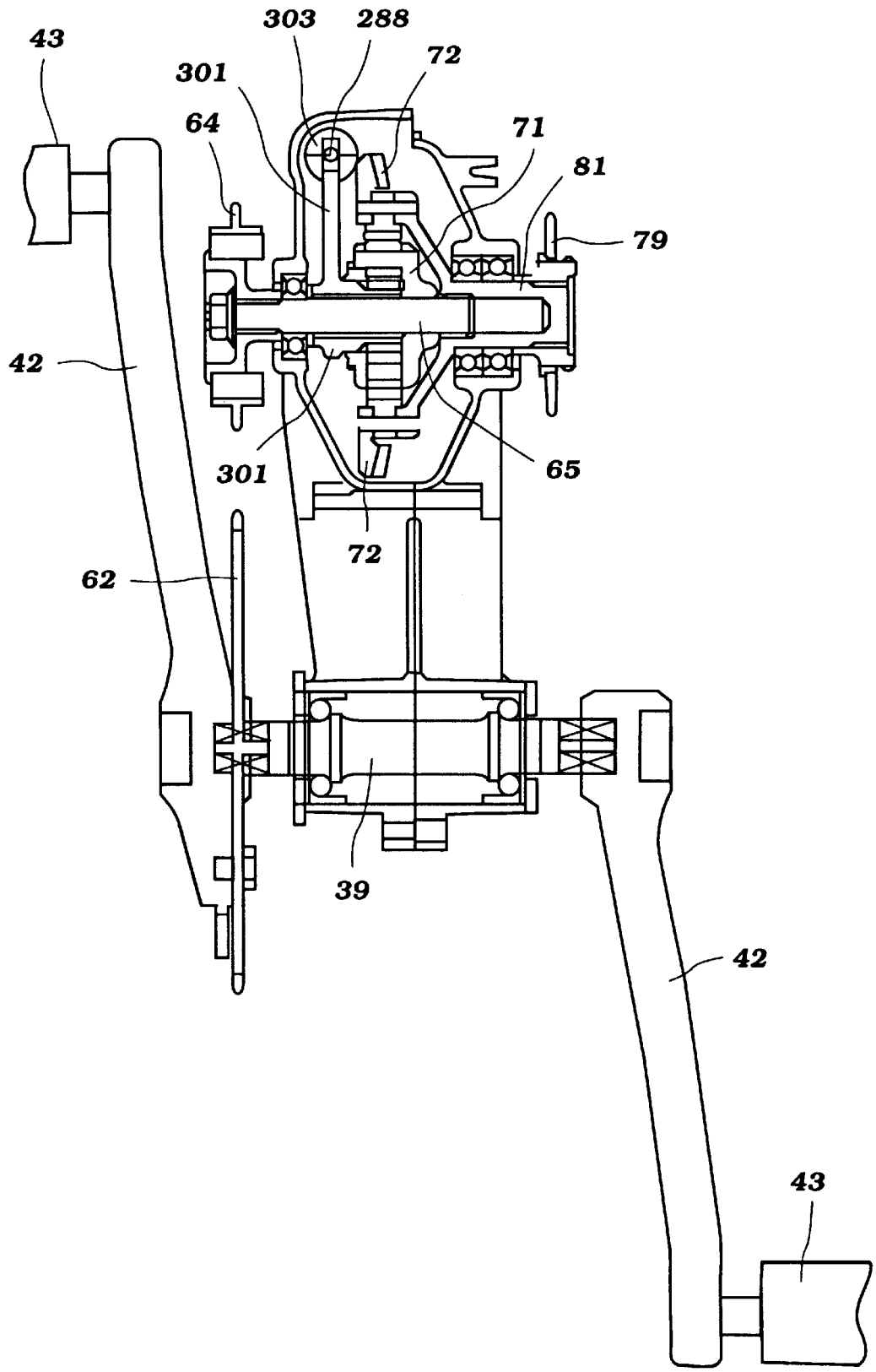
FIG. 19 is a cross-sectional view taken through the crankshaft and transfer shaft axis and shows another embodiment of torque sensor arrangement.
Figure 20:
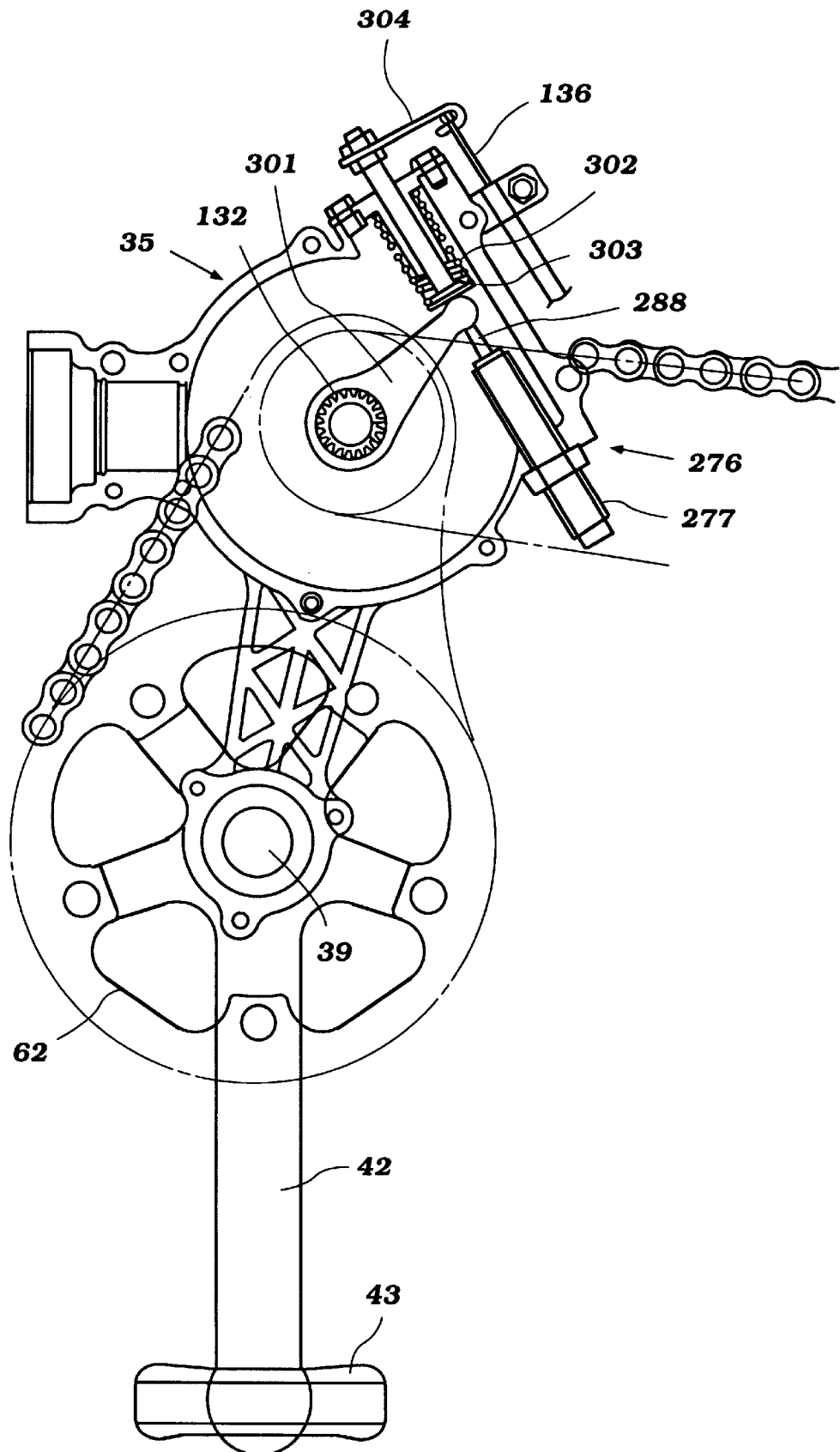
FIG. 20 is a view looking perpendicular to the view of FIG. 19 and showing the same components.

FIGS. 19 and 20 show another embodiment of the invention which is generally similar to the embodiment of FIGS. 8–18. In this embodiment, however, the gear drive connection to the torque sensing arm is eliminated and the components for the torque sensor can be positioned substantially entirely within the transmission case 35.

Hence, in this embodiment, a torque sensing arm 301 is coupled by a spline connection to the sun gear 132. A plunger-type follower 302 is contained within the transmission case 35 and has an end portion 303 that is biased by the spring into engagement with the torque arm 301. An external bracket 304 provides a connection to the throttle wire actuator element 136.

The hydraulic damper mechanism, which has the same construction as that shown in FIG. 17 and, hence, which is identified by the same reference numeral 276, is also mounted in the housing so that its plunger 288 extends into the transmission cavity of the transmission case 35.

Figure 21:
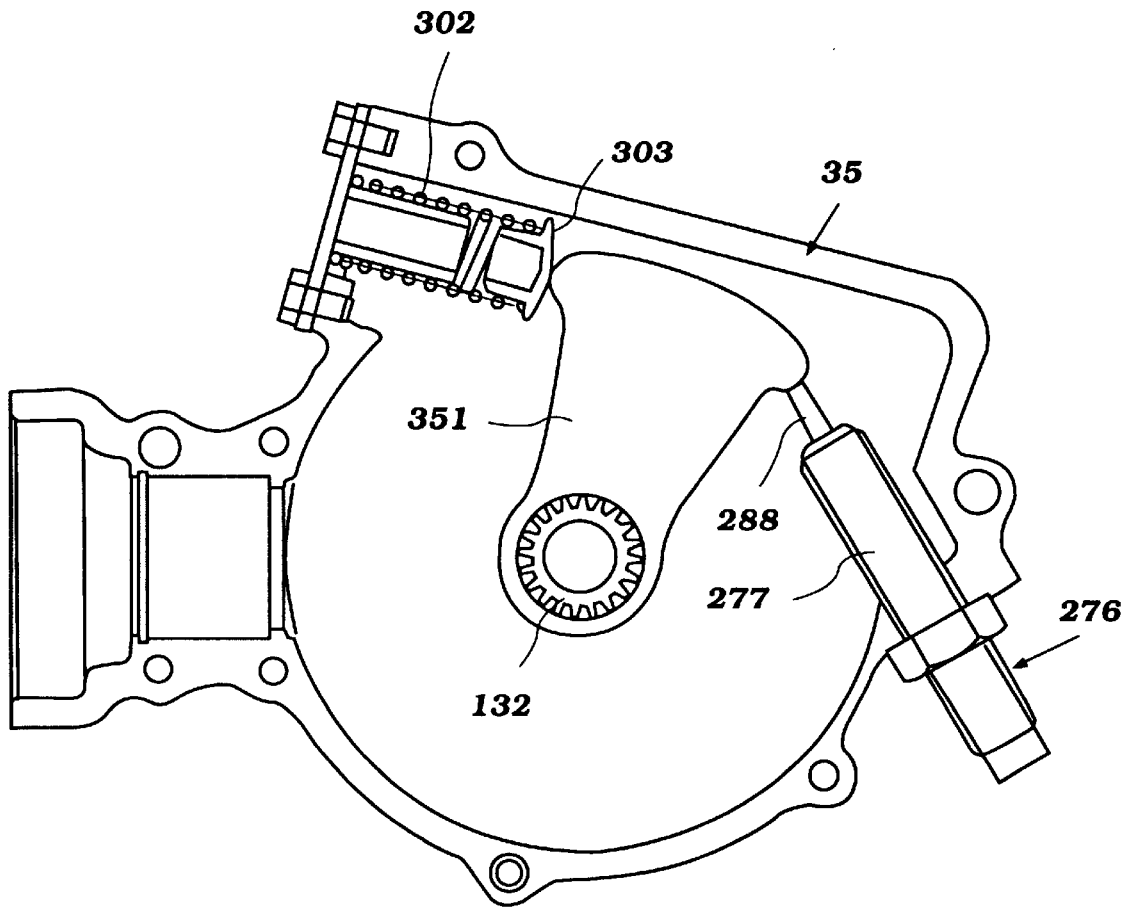
FIG. 21 is a view, in part similar to FIG. 20, and shows a further embodiment of torque damping arrangement.

FIG. 21 illustrates another embodiment similar to the embodiment of FIGS. 19 and 20. In this embodiment, however, the torque sensing arm, indicated by the reference numeral 351, has a wider end so that the follower portion 302 and damper portion 276 need not be aligned. This permits greater flexibility in locating the components.

From the foregoing description it should be readily apparent to those skilled in the art that the described embodiment of the invention is very effective in providing good engine control. It should be apparent to those skilled in the art that the foregoing description, however, is that of preferred embodiments of the invention and that various changes and modifications may be made without departing from the spirit and scope of the invention, as defined by the appended claims.

What is claimed is:

1. A power-assisted, manually power operated vehicle comprised of a frame assembly dirigibly supporting at least one front wheel at the forward end thereof and rotatably supporting at least one driven wheel at the rear end thereof, a seat carried by said frame assembly for accommodating a rider, a crank mechanism including a crankshaft journaled for rotation at a lower portion of said frame assembly about a crankshaft axis and having pedals for operation by a rider seated on said seat, a transfer shaft rotatably journaled about a transfer shaft axis disposed vertically above said crankshaft axis and driven by a first transmission from said crankshaft, a final drive transmission for driving said rear wheel from said transfer shaft, a prime mover carried by said frame assembly and disposed forwardly of said transfer shaft, and a second transmission includes a drive shaft extending from an output shaft of the prime mover toward the rear wheel for driving said transfer shaft from said prime mover.

2. A power-assisted, manually-powered operated vehicle as set forth in claim 1, wherein the second transmission comprises a step-down transmission.

3. A power-assisted, manually-powered operated vehicle as set forth in claim 2, wherein the first transmission comprises a step-up transmission.

4. A power-assisted, manually-powered operated vehicle as set forth in claim 3, wherein the final drive comprises a step-down transmission.

5. A power-assisted, manually-powered operated vehicle as set forth in claim 1, wherein the rear wheel is supported by a pair of parallel chain guards that extend from said rear wheel forwardly and which lie in a common, generally horizontally extending plane and the drive shaft rotates about a driveshaft axis that lies substantially within said common, generally horizontally extending plane.

6. A power-assisted, manually-powered operated vehicle as set forth in claim 1, wherein the rear wheel is journaled by a pair of parallel chain guards that extend from said rear wheel forwardly and which lie in a common, generally horizontally extending plane and wherein the drive shaft rotates about a driveshaft axis that is not in line with, but intersects, said common, generally horizontally extending plane.

7. A power-assisted, manually-powered operated vehicle as set forth in claim 6, wherein the angle between the drive shaft and the common, generally horizontally extending plane is less than one hundred and eighty degrees (180°).

8. A power-assisted, manually-powered operated vehicle as set forth in claim 7, wherein a plane containing the axis of rotation of the crankshaft and the transfer shaft lies at an obtuse angle to the common, generally horizontally extending plane and an acute angle to the axis of the drive shaft.

9. A power-assisted, manually-powered operated vehicle as set forth in claim 1, wherein the prime mover and the second transmission are resiliently suspended by the frame assembly.

10. A power-assisted, manually-powered operated vehicle as set forth in claim 9, wherein the resilient support for the prime mover and the second transmission is more resilient in a rotational direction relative to the axis of rotation of an output shaft of the prime mover than in transverse directions to said axis of rotation.

11. A power-assisted, manually-powered operated vehicle as set forth in claim 1, wherein the prime mover comprises an internal combustion engine having a crankshaft.

12. A power-assisted, manually-powered operated vehicle as set forth in claim 11, wherein the second transmission includes a drive shaft driven by the engine crankshaft for driving the transfer shaft.

13. A power-assisted, manually-powered operated vehicle as set forth in claim 12, wherein the rear wheel is journaled by a pair of parallel chain guards that extend from said rear wheel forwardly and which lie in a common, generally horizontally extending plane and wherein the drive shaft rotates about a drive shaft axis that lies within said common, generally horizontally extending plane.

14. A power-assisted, manually-powered operated vehicle as set forth in claim 12, wherein the rear wheel is journaled by a pair of parallel chain guards that extend from said rear wheel forwardly and which lie in a common, generally horizontally extending plane and wherein the drive shaft rotates about a drive shaft axis that is not in line, but intersects, said common, generally horizontally extending plane.

15. A power-assisted, manually-powered operated vehicle as set forth in claim 14, wherein the angle between the drive shaft axis and the common, generally horizontally extending plane is less than one hundred and eighty degrees (180°).

16. A power-assisted, manually-powered operated vehicle as set forth in claim 1, further including a torque sensor for sensing the torque applied to the crankshaft and for controlling the amount of driving power assist provided by the prime mover in response to the sensed torque.

17. A power-assisted, manually-powered operated vehicle as set forth in claim 16, wherein the torque sensor is sensitive to the torque existent in the first transmission.

18. A power-assisted, manually-powered operated vehicle as set forth in claim 17, further including a hydraulic damper for retarding movement of the torque sensor in one direction.

19. A power-assisted, manually-powered operated vehicle as set forth in claim 18, wherein the one direction comprises the torque reduction direction.

20. A power-assisted, manually-powered operated vehicle as set forth in claim 1, wherein the drive shaft rotates about an axis that is disposed vertically above the axis of rotation of the crankshaft and which extends generally transversely to the axis of rotation of the crankshaft and longitudinally of the frame assembly.

21. A power-assisted, manually-powered operated vehicle as set forth in claim 20, wherein the second transmission comprises a step-down transmission.

22. A power-assisted, manually-powered operated vehicle as set forth in claim 21, wherein the first transmission comprises a step-up transmission.

23. A power-assisted, manually-powered operated vehicle as set forth in claim 22, wherein the final drive comprises a step-down transmission.

24. A power-assisted, manually-powered operated vehicle as set forth in claim 23, wherein the rear wheel is supported by a pair of parallel chain guards that extend from said rear wheel forwardly and which that lie in a common, generally horizontally extending plane and the drive shaft rotates about a drive shaft axis that is substantially aligned with said common, generally horizontally extending plane.

25. A power-assisted, manually-powered operated vehicle as set forth in claim 23, wherein the rear wheel is journaled by a pair of parallel chain guards that extend from said rear wheel forwardly and which that lie in a common, generally horizontally extending plane and wherein the drive shaft rotates about a drive shaft axis that is not in line with, but intersects, said common, generally horizontally extending plane.

26. A power-assisted, manually-powered operated vehicle as set forth in claim 25, wherein the angle between the drive shaft axis and the common, generally horizontally extending plane is less than one hundred and eighty degrees (180°).

27. A power-assisted, manually-powered operated vehicle as set forth in claim 26, wherein a plane containing the axis of rotation of the crankshaft and the transfer shaft lies at an obtuse angle to the common, generally horizontally extending plane and an acute angle to the axis of the drive shaft.

28. A power-assisted, manually-power operated vehicle comprised of a frame assembly dirigibly supporting at least one front wheel at the forward end thereof and rotatably supporting at least one driven wheel at the rear end thereof, a seat carried by said frame assembly for accommodating a rider, a crank mechanism including a crankshaft journaled for rotation at a lower portion of said frame assembly about a crankshaft axis and having pedals for operation by a rider seated on said seat, a transfer shaft rotatably journaled about a transfer shaft axis disposed vertically above said crankshaft axis and driven by a first transmission from said crankshaft, a final drive transmission for driving said rear wheel from said transfer shaft, a prime mover carried by said frame assembly and disposed forwardly of said transfer shaft, and a second transmission includes a drive shaft extending from an output shaft of the prime mover toward the rear wheel for driving said transfer shaft from said prime mover, the entire transmission ratio from said prime mover to said driven wheel comprising a step-down ratio while the transmission from said crankshaft to said driven wheel is a step-up transmission.

29. A power-assisted, manually-powered operated vehicle as set forth in claim 28, wherein the second transmission comprises a step-down transmission.

30. A power-assisted, manually-powered operated vehicle as set forth in claim 28, wherein the first transmission comprises a step-up transmission.

31. A power-assisted, manually-powered operated vehicle as set forth in claim 28, wherein the final drive comprises a step-down transmission.

32. A power-assisted, manually-powered operated vehicle as set forth in claim 31, wherein the second transmission comprises a step-down transmission.

33. A power-assisted, manually-powered operated vehicle as set forth in claim 32, wherein the first transmission comprises a step-up transmission.

* * * * *